US012507966B2

(12) United States Patent
Petersen et al.

(10) Patent No.: US 12,507,966 B2
(45) Date of Patent: Dec. 30, 2025

(54) HIGH RESOLUTION AND HIGH SENSITIVITY PET SCANNER WITH PRISM-PET DETECTOR MODULES

(71) Applicant: THE RESEARCH FOUNDATION FOR THE STATE UNIVERSITY OF NEW YORK, Albany, NY (US)

(72) Inventors: Eric Petersen, Kings Park, NY (US); Amir H. Goldan, East Setauket, NY (US); Andrew Labella, New Rochelle, NY (US); Wei Zhao, East Setauket, NY (US); Adrian Howansky, Centereach, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 286 days.

(21) Appl. No.: 17/801,958

(22) PCT Filed: Feb. 24, 2021

(86) PCT No.: PCT/US2021/019463
§ 371 (c)(1),
(2) Date: Aug. 24, 2022

(87) PCT Pub. No.: WO2021/173708
PCT Pub. Date: Sep. 2, 2021

(65) Prior Publication Data
US 2023/0129006 A1    Apr. 27, 2023

Related U.S. Application Data

(60) Provisional application No. 63/138,023, filed on Jan. 15, 2021, provisional application No. 62/980,591, filed on Feb. 24, 2020.

(51) Int. Cl.
*A61B 6/03* (2006.01)
*G01T 1/164* (2006.01)
(Continued)

(52) U.S. Cl.
CPC ............ *A61B 6/037* (2013.01); *G01T 1/2985* (2013.01); *G06V 10/143* (2022.01);
(Continued)

(58) Field of Classification Search
CPC ..... A61B 6/037; A61B 6/0407; A61B 6/4258; A61B 6/5258; G01T 1/1644;
(Continued)

(56) References Cited

U.S. PATENT DOCUMENTS 6,224,561 B1    5/2001    Swendson et al.
6,447,527 B1    9/2002    Thompson et al.
(Continued)

FOREIGN PATENT DOCUMENTS

EP    3014397 B1    4/2020
JP    2015007636 A    1/2015
(Continued)

OTHER PUBLICATIONS

International Search Report dated May 6, 2021 issued in PCT/US2021/019463.
(Continued)

*Primary Examiner* — David J Makiya
*Assistant Examiner* — Soorena Kefayati
(74) *Attorney, Agent, or Firm* — Scully, Scott, Murphy & Presser, P.C.

(57) ABSTRACT

The disclosure relates to a device and positron emission tomography (PET) scanner for acquiring a PET image and a system for generating the PET image. The disclosure describes a device that may have one or more moveable portions. The device may comprise an upper portion and a
(Continued)

lower portion. The upper portion and lower portion define a cavity for a patient. At least one of the upper portion or the lower portion may be movable. The upper and lower portions may comprise a cap and wings, respectively, At least one of the caps and/or wings may comprise one or more detection modules. The wings may also move with respect to a corresponding cap.

24 Claims, 22 Drawing Sheets

(51) Int. Cl.
  *G01T 1/29* (2006.01)
  *G06V 10/143* (2022.01)
  *G06V 10/147* (2022.01)
  *G06V 20/64* (2022.01)
(52) U.S. Cl.
  CPC ............ *G06V 10/147* (2022.01); *G06V 20/64* (2022.01); *G01T 1/1644* (2013.01)
(58) Field of Classification Search
  CPC .. G01T 1/2985; G06V 10/147; G06V 10/143; G06V 20/64
  See application file for complete search history.

(56) References Cited

U.S. PATENT DOCUMENTS

| | | | |
|---|---|---|---|
| 7,303,545 | B2 | 12/2007 | Sarstedt |
| 7,858,944 | B2* | 12/2010 | Majewski ................ A61B 6/50 250/363.03 |
| 8,025,502 | B2 | 9/2011 | Rose et al. |
| 8,128,661 | B2 | 3/2012 | Zucherman et al. |
| 8,591,543 | B2 | 11/2013 | Abo-Auda et al. |
| 9,790,977 | B2 | 10/2017 | Baran et al. |
| 9,895,055 | B2 | 2/2018 | Schaeffer et al. |
| 10,195,355 | B2 | 2/2019 | Allerdings et al. |
| 10,203,419 | B2* | 2/2019 | Frazao ................ G01T 1/20182 |
| 10,213,174 | B1* | 2/2019 | Grobshtein .......... A61B 6/4266 |
| 10,272,263 | B2 | 4/2019 | Hoffman et al. |
| 10,561,935 | B2 | 2/2020 | Tiffany et al. |
| 10,786,177 | B1 | 9/2020 | Ahmad et al. |
| 10,806,416 | B2* | 10/2020 | Li .......................... A61B 5/004 |
| 10,828,187 | B2 | 11/2020 | Wilson |
| 11,094,178 | B2 | 8/2021 | Um |
| 11,096,587 | B2 | 8/2021 | Binkowski |
| 11,284,980 | B2 | 3/2022 | Wagner |
| 11,684,548 | B2 | 6/2023 | Schweiss et al. |
| 11,744,935 | B2 | 9/2023 | Dale et al. |
| 11,839,741 | B2 | 12/2023 | Langenfeld et al. |
| 11,950,789 | B2 | 4/2024 | Lynch et al. |
| 12,011,196 | B2 | 6/2024 | Wolters et al. |
| 12,016,589 | B2 | 6/2024 | Murphy |
| 12,023,468 | B2 | 7/2024 | Holroyd et al. |
| 12,220,359 | B2 | 2/2025 | Hertz et al. |
| 12,233,246 | B2 | 2/2025 | Bauer et al. |
| 12,251,137 | B2 | 3/2025 | Schlaepfer et al. |
| 2004/0097800 | A1* | 5/2004 | Crosetto ................ A61B 6/037 600/407 |
| 2004/0251419 | A1* | 12/2004 | Nelson .................... G01T 1/243 250/370.09 |
| 2009/0074151 | A1 | 3/2009 | Henderson et al. |
| 2010/0001192 | A1* | 1/2010 | Lange ...................... A61B 6/04 250/363.1 |
| 2010/0002924 | A1* | 1/2010 | Park ...................... A61B 6/032 378/4 |
| 2011/0026685 | A1* | 2/2011 | Zilberstein .......... A61B 6/4266 378/197 |
| 2011/0073763 | A1* | 3/2011 | Subbarao ............ G01T 1/1611 250/363.04 |
| 2011/0073764 | A1* | 3/2011 | Woldemichael ...... G01T 1/1647 250/362 |
| 2011/0096897 | A1* | 4/2011 | Tonami ..................... G21F 3/00 378/21 |
| 2011/0129061 | A1* | 6/2011 | Janbakhsh ............. A61B 6/032 250/363.05 |
| 2012/0061577 | A1* | 3/2012 | Oleinik ............... G01T 1/20183 250/366 |
| 2012/0068077 | A1* | 3/2012 | Frach .................. H03M 1/0827 250/369 |
| 2012/0267536 | A1* | 10/2012 | Gagnon ................ G01T 1/1644 250/363.03 |
| 2012/0271164 | A1* | 10/2012 | Gagnon ................ G01T 1/2985 600/427 |
| 2012/0278034 | A1* | 11/2012 | Dong .................... G01T 1/2985 702/152 |
| 2014/0091223 | A1* | 4/2014 | Menge .................. G01T 1/2006 250/366 |
| 2014/0276019 | A1* | 9/2014 | Majewski ............. G01T 1/2985 600/425 |
| 2014/0343412 | A1* | 11/2014 | Wieczorek .............. G01T 1/249 600/425 |
| 2015/0065873 | A1* | 3/2015 | Tsukerman .......... A61B 6/4447 600/436 |
| 2015/0065874 | A1* | 3/2015 | Rafaeli ................ A61B 6/0407 600/436 |
| 2015/0173696 | A1* | 6/2015 | Zingerman ............... A61B 6/06 378/9 |
| 2015/0196268 | A1* | 7/2015 | Bhattacharya ......... A61B 6/037 600/425 |
| 2015/0366519 | A1* | 12/2015 | Furuta ................... G01T 1/2985 600/431 |
| 2015/0378035 | A1* | 12/2015 | Choi ...................... A61B 6/037 250/363.03 |
| 2017/0285191 | A1* | 10/2017 | Hugg ...................... G01T 1/243 |
| 2019/0015058 | A1* | 1/2019 | Álamo Valenzuela ...................... A61B 6/4452 |
| 2019/0053772 | A1* | 2/2019 | Benlloch Baviera ........................ G01T 1/2985 |
| 2019/0261934 | A1* | 8/2019 | Seo .......................... A61B 6/03 |
| 2020/0305811 | A1* | 10/2020 | Benlloch Baviera ........................ A61B 6/4275 |
| 2020/0326434 | A1 | 10/2020 | Goldan et al. |
| 2020/0345322 | A1* | 11/2020 | Bai ...................... A61B 6/4266 |
| 2021/0219932 | A1* | 7/2021 | Bouhnik .............. A61B 6/4258 |
| 2021/0219937 | A1* | 7/2021 | Bouhnik .............. A61B 6/4266 |
| 2021/0307708 | A1* | 10/2021 | Vallgren ............... A61B 6/037 |

FOREIGN PATENT DOCUMENTS

| | | |
|---|---|---|
| JP | 6869388 B2 | 5/2021 |
| KR | 100696937 B1 | 3/2007 |
| KR | 200438058 Y1 | 1/2008 |
| KR | 102592660 B1 | 10/2023 |
| WO | 2015159415 A1 | 10/2015 |
| WO | 2019106150 A1 | 6/2019 |

OTHER PUBLICATIONS

Moehrs, S., "Modeling of pixelated and continuous crystals for high-resolution small animal positron emission tomography", PhD Thesis in Applied Physics, Dec. 19, 2008, pp. 1-176.
Labella, A. et al., "Prism Mirror Light Guide for Enhanced Gamma Ray Localization in PET", 2019 IEEE Nuclear Science Symposium and Medical Imaging Conference (NSS/MIC), Oct. 26, 2019, pp. 1-4.
Extended European Search Report dated Dec. 11, 2023 received in European Patent Application No. EP 21760945.2.
Notice of Reasons for Rejection dated Nov. 5, 2024 received in Japanese Patent Application No. 2022-550825.
Notice of Reasons for Refusal dated Apr. 8, 2025 received in Japanese Patent Application No. 2022-550825.
First Office Action dated Jun. 20, 2025 received in Chinese patent Application No. 202180016472.4.

* cited by examiner

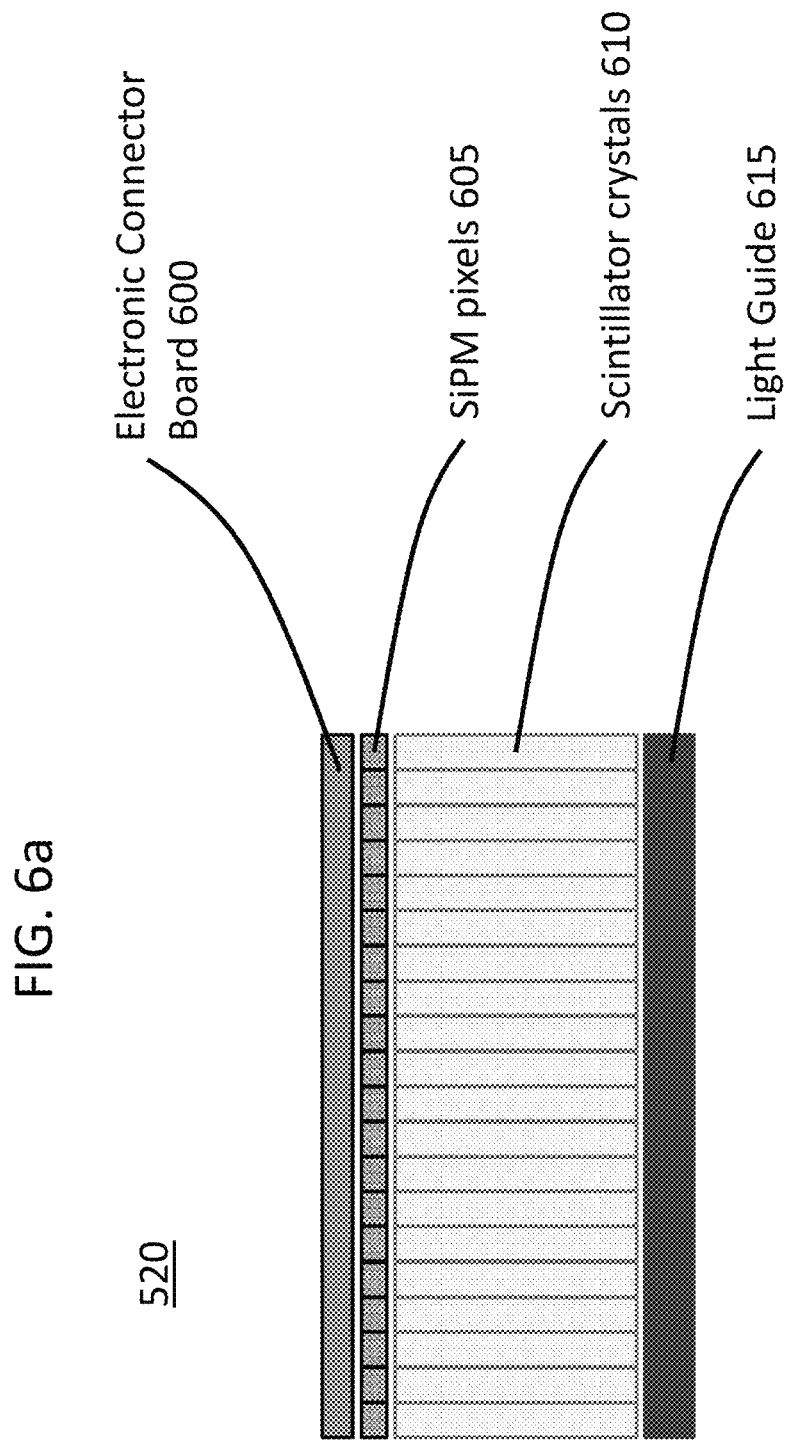

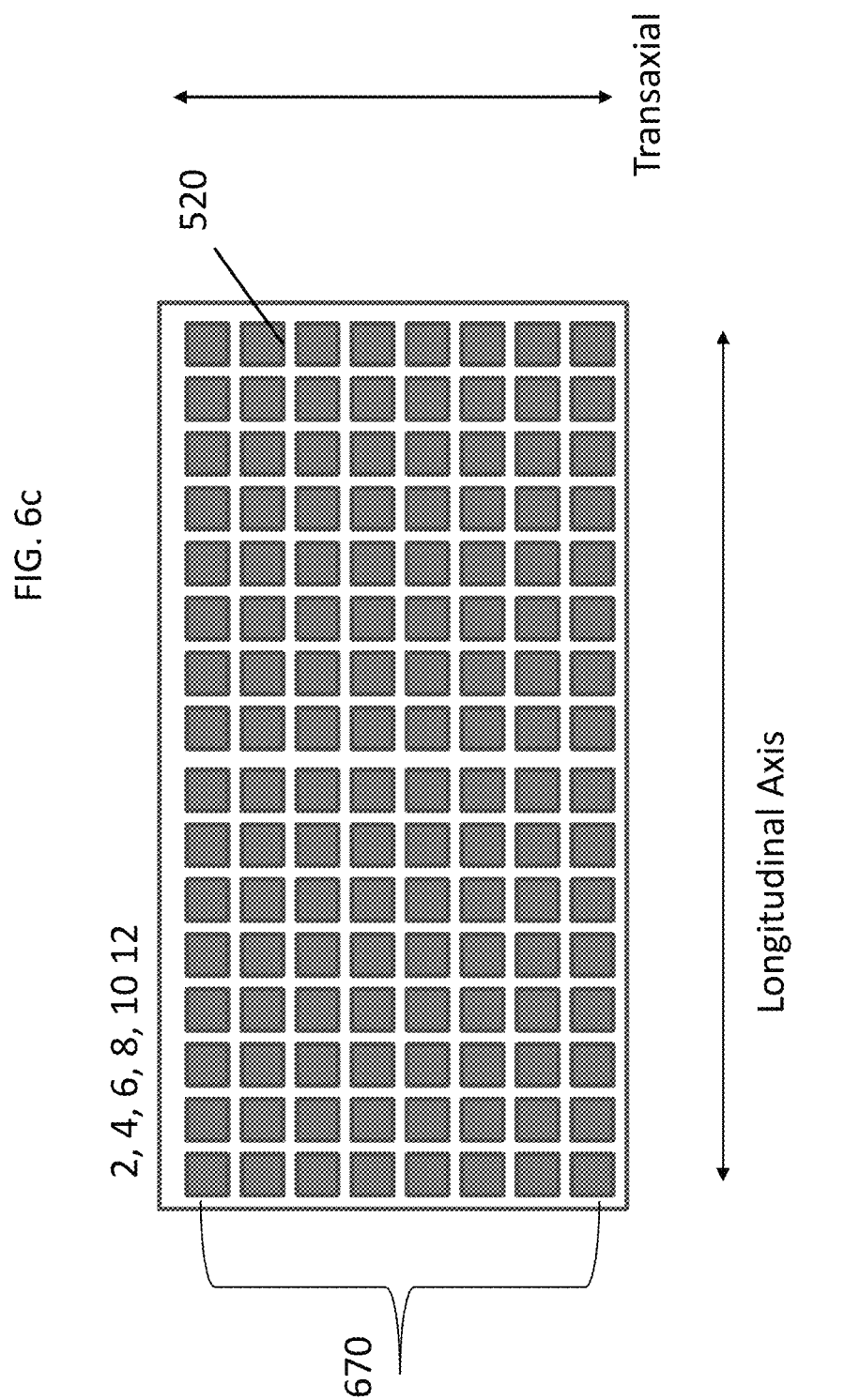

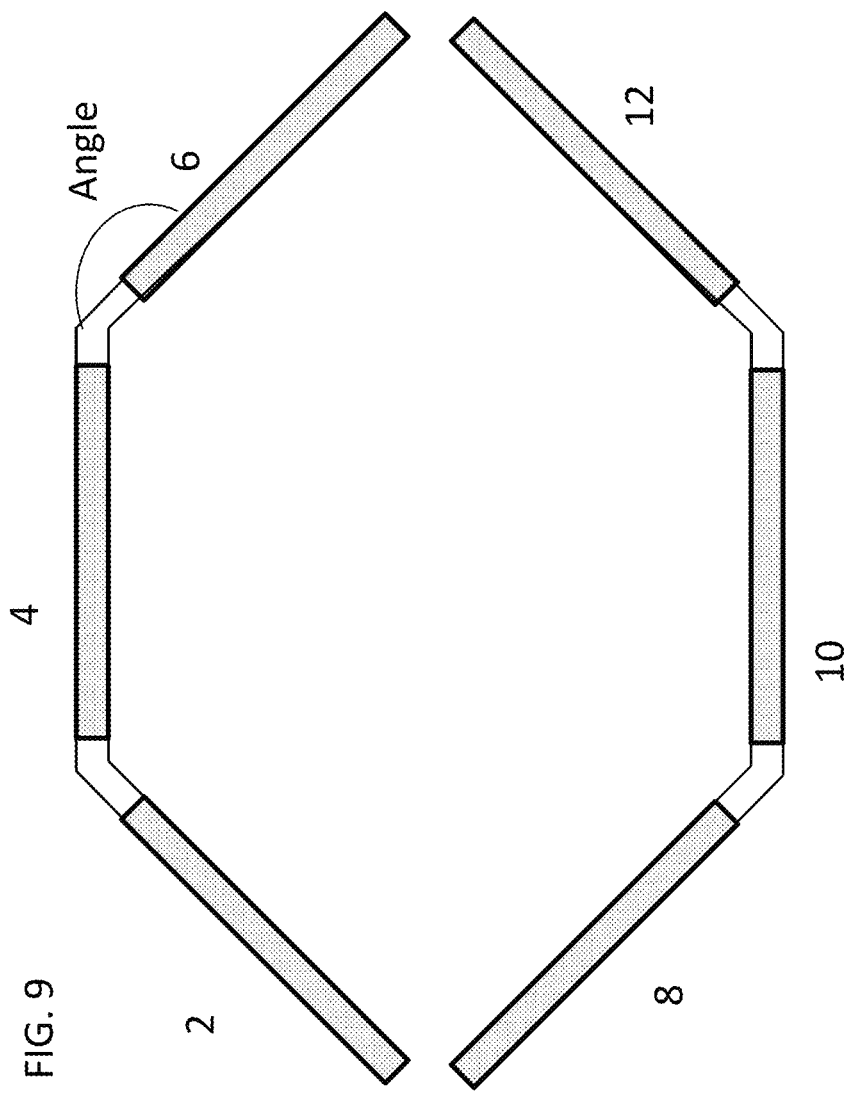

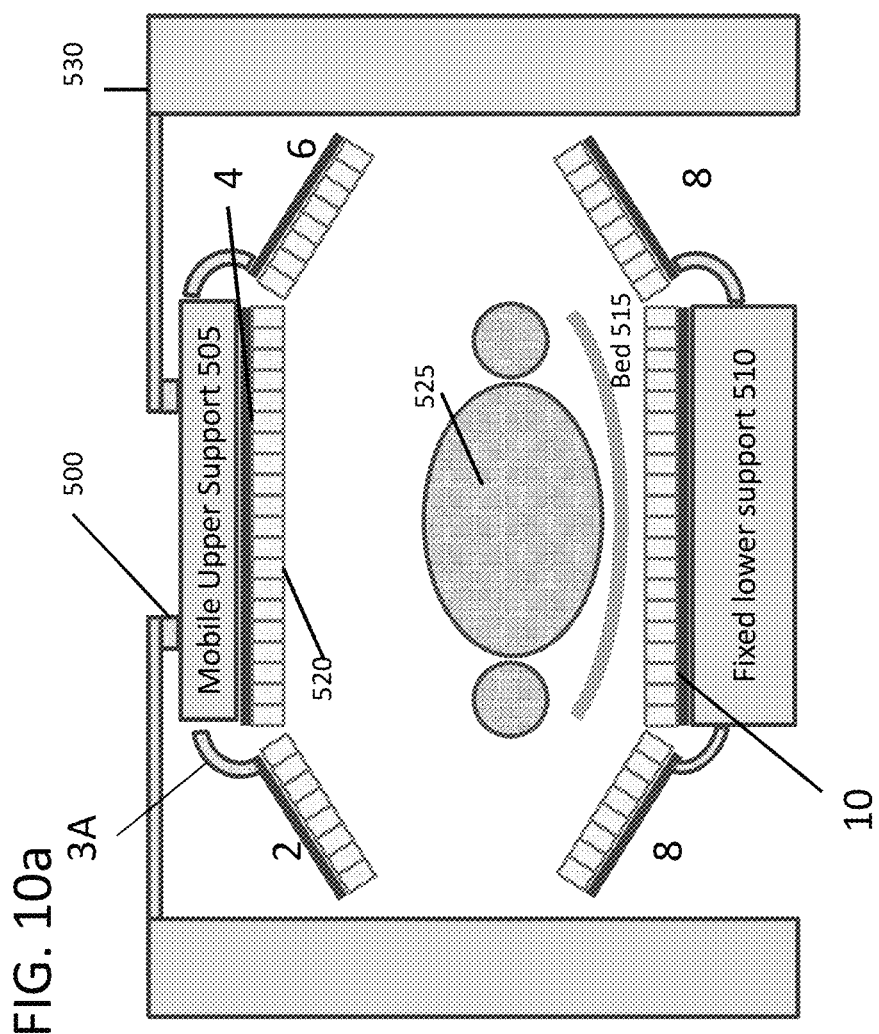

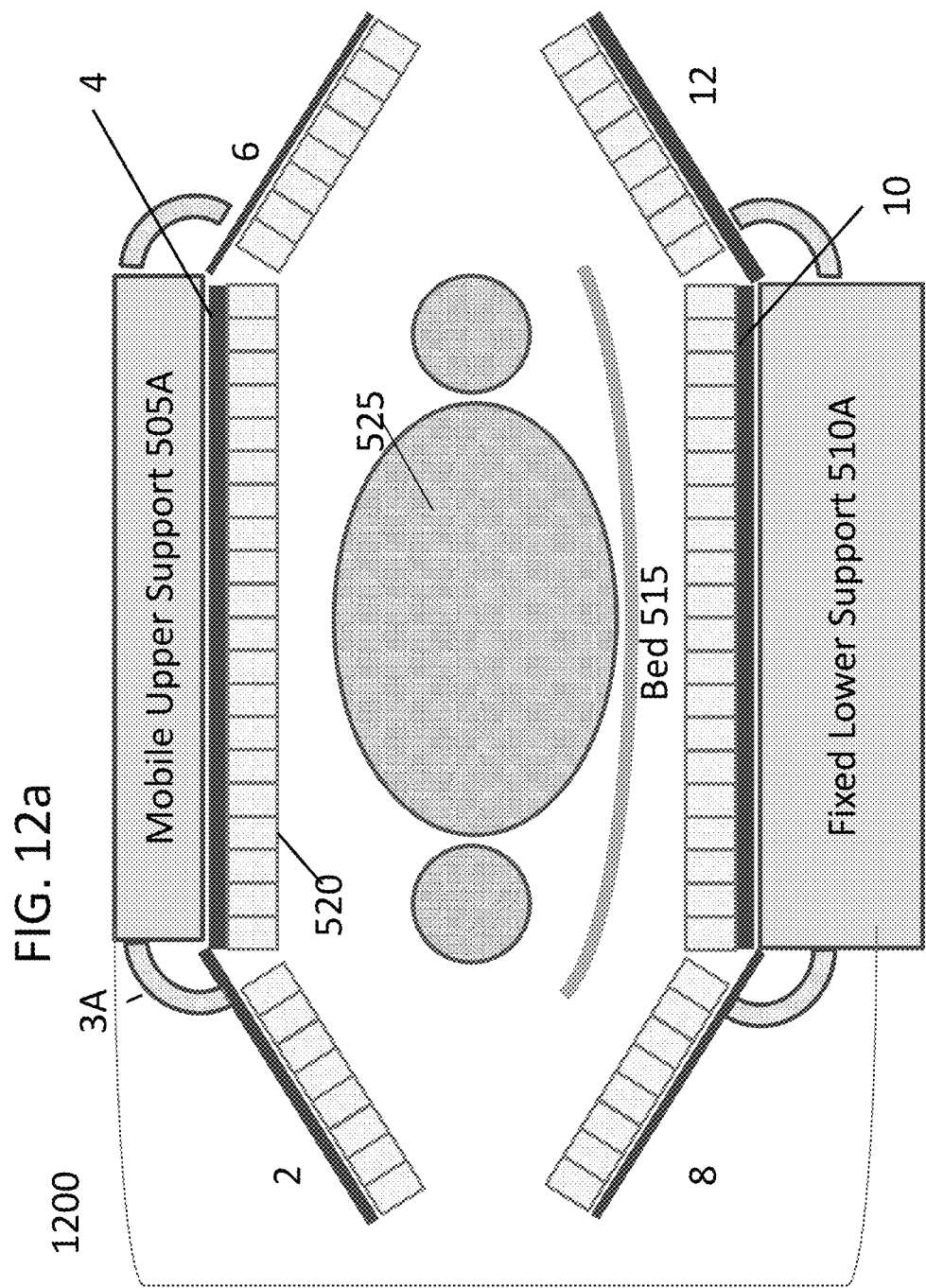

| Head Circumference | Position of Upper Cap | Position of Wings | System Matrix | Geometric Dependent Modules |
|---|---|---|---|---|
| H1 | P1 | V1 | SM1 | M1 |
| H2 | P2 | V1 | SM2 | M2 |

| Bust Depth | Forearm-Forearm Breath | Position of Upper Cap | Position of Wings | System Matrix | Geometric Dependent Modules |
|---|---|---|---|---|---|
| B1 | F1 | PX | VA | SMZ | MA |
| B1 | F2 | PX | VB | SMY | MB |
| B2 | F1 | PY | VC | SMX | MC |
| B2 | F2 | PY | VD | SMW | MD |

| | Biograph Vision | ArcPET |
|---|---|---|
| Geometric efficiency | 30.2 % | 51.8 % |
| Spatial resolution limit (mm fwhm) | 2.4 | 1.9 |
| Scintillator crystal surface area (cm²) | 6698 | 3900 |
| Dimensions | $D = 82$ cm<br>$L = 26$ cm | $a_{cap} = a_{wing} = 25$ cm<br>$b = 26$ cm<br>$h_{cap} = 17.7$ cm<br>$\theta = \pi/4$ |

HIGH RESOLUTION AND HIGH SENSITIVITY PET SCANNER WITH PRISM-PET DETECTOR MODULES

CROSS-REFERENCE TO RELATED APPLICATIONS

This application claims the benefit of U.S. Provisional Application No. 62/980,591 filed on Feb. 24, 2020, and U.S. Provisional Application No. 63/138,023 filed on Jan. 15, 2021.

FIELD

The present disclosure relates generally to the field of radiation imaging and, in particular, to positron emission tomography (PET).

BACKGROUND

Imaging with PET is a powerful technique used primarily for diagnosis, treatment selection, treatment monitoring and research in cancer and neuropsychiatric disorders. Despite its high molecular specificity, quantitative nature and clinical availability, PET has not been able to achieve its full potential as the go-to molecular imaging modality due in large part to its relatively poor spatial resolution, currently on the order of 3-6 mm. With this kind of spatial resolution, the current device cannot possibly measure target density in small nodules and in many human and rodent brain regions relevant to disease etiology and pathophysiology.

Depth-encoding PET detector modules have been developed to mitigate parallax error (mispositioning of the line of response) for long scintillator crystals. This enables small diameter PET rings with reduced component cost per detector ring, large solid angle coverage for increased sensitivity, and reduced contribution of annihilation gamma ray acol-linearity on spatial resolution when using crystals with small cross-sectional area. In addition, depth-of-interaction (DOI) information can be used to deconvolve optical photon transport in long crystals, thus improving timing resolution. Depth-encoding detectors based on dual-ended readout achieve the best continuous DOI resolution of <2 mm.

High resolution PET systems such as mammography dedicated Clear-PEM have been developed using dual-ended DOI readout detectors, but these systems are too costly to be commercialized due to the large number of readout electronics compared to standard single-ended readout PET scanners. A recently developed high resolution variant of these detectors shows relatively poor energy and timing resolutions. Alternative single-ended readout detector modules have been proposed, however, in all these designs tradeoffs exist among depth-encoding, cost, scintillator-to-readout coupling ratio, crystal identification accuracy, energy resolution, and timing resolution. To mitigate these tradeoffs, a good depth-encoding detector module is one with single-ended readout where the crystal array is directly coupled to silicon photomultiplier (SiPM) pixels, without any intermediate glass light guide, to minimize sharing of downward traveling scintillation photons across multiple pixels and retain good timing resolution. In addition, upward traveling photons, which do not contribute to the timing information, should be redirected via 180° bending of their paths towards the nearest neighboring SiPMs to retain good energy and DOI resolutions and mimic the behavior of dual-ended depth-encoding readout detectors.

Accordingly, detector modules consisting of depolished multicrystal scintillator arrays coupled 4-to-1 to SiPM pixels on one side and a uniform glass light guide on the opposite side have been investigated in efforts to develop a practical and cost-effective high resolution time-of-flight (TOF) PET scanner, as well as achieve continuous DOI localization using single-ended readout. See, U.S. Pat. No. 10,203,419 to Frazao et al., the contents of which are incorporated herein by reference. In these detector modules, energy weighted average method is utilized for crystal identification to achieve energy and DOI resolutions of 9% and 3 mm full width at half maximum (FWHM), respectively, using $1.53\times1.53\times15$ mm$^3$ crystals and $3\times3$ mm$^2$ SiPM pixels. However, these arrays suffer from poor crystal identification along their edges and corners due to the lack of light sharing neighbors, an issue that must be addressed since the edge and corner pixels comprise 75% and 44% of 4×4 and 8×8 SiPM readout chips, respectively. Also, intercrystal light sharing is inefficient when using a uniform glass light guide since many upward traveling photons are reflected back into the primary column and the rest are isotropically shared with a Gaussian intensity distribution amongst neighbors. The problem with isotropic light sharing is the distribution of low-intensity signal across many SiPMs, the integrity of which will be severely affected by dark counts, resulting in degraded energy and DOI resolutions.

Further, other PET detectors have been created, in an attempt to increase DOI resolution, but these detectors require a rigid, cylindrical geometry that must have a fixed diameter large enough to extend over any part of a human's body, which causes readouts to be susceptible to geometrical artifacts.

Further, the geometry of modern PET scanners is heavily influenced by technological limitations. Specifically, lack of a cost-effective DOI-capable detector module drives the creation of PET scanners with fixed, cylindrical geometry and very large ring diameter. As a result, the scanner must be designed to accommodate the largest patients at great expense to the resolution and sensitivity afforded to smaller and pediatric patients.

SUMMARY

Accordingly, disclosed is a device comprising an upper portion and a lower portion. The upper portion may comprise an upper cap and upper wings. The upper cap may be operably connected to the upper wings. At least one of the upper wings may be operably connected to a first side and at least one of the upper wings may be operably connected to a second side. The second side may be opposite of the first side. The lower portion may comprise a lower cap and lower wings. The lower cap may be operably connected to the lower wings. At least one of the lower wings may be operably connected to a first side and at least one of the lower wings may be operably connected to a second side. The second side may be opposite of the first side. The upper portion and lower portion define a cavity. At least one of the upper portion or the lower portion may be movable. At least one of the caps and/or wings comprises one or more detection modules.

In an aspect of the disclosure, the upper portion is moveable relative to the lower portion.

In an aspect of the disclosure, a position of the upper cap is determined based on a measurement of at least one feature of a patient to be inserted into the cavity and a determined clinical application.

In an aspect of the disclosure, one or both of the upper and/or the lower wings may be operably connected to the cap, respectively, such as via a hinge such that at least one wing is rotatable. The angle of rotation may be determined based on a measurement of at least one feature of a patient to be inserted into the cavity and a determined clinical application.

In an aspect of the disclosure, the clinical application may be a brain scan or a whole-body scan.

In an aspect of the disclosure, at least one feature may be one or more of a patient's head, bust depth and/or forearm-forearm breath.

In an aspect of the disclosure, the detector module may comprise a scintillator array comprising a plurality of scintillator crystals, a plurality of detectors provided on a bottom end of the scintillator array; and a plurality of prismatoids provided on a top end of the scintillator array. Each prismatoid may be configured to redirect particles between top ends of scintillator crystals of the scintillator array. The bottom ends of a first group of scintillator crystals of the scintillator array may be configured to direct particles to a first detector of the plurality of detectors. Additionally, the bottom ends of a second group of scintillator crystals may be configured to direct particles to a second detector substantially adjacent to the first detector.

In an aspect of the disclosure, the device may further comprise side portions. One or more of the side portions may comprise one or more detection modules.

In an aspect of the disclosure, the side portions may be moveable. In an aspect of the disclosure, the side portions may move between the upper portion and the lower portion such that the device substantially surrounds a patient when inserted.

Also disclosed is a positron emission tomography (PET) system for acquiring a PET image. The PET system may include a processor to control the position of the upper or lower cap and/or angles of the wings, respectively.

In an aspect of the disclosure, the position of the upper or lower cap may be one of a plurality of preset positions and/or angles.

In an aspect of the disclosure, the position and/or angle may be selected by the processor based on the measurements such as one or more of the bust depth, head circumference and/or forearm-forearm breath.

In an aspect of the disclosure, the system further comprises a memory having one or more tables comprising available positions and/or angles and associated measurements of features.

In an aspect of the disclosure, the one or more tables may be used to select the position and/or angle based on actual measurements of one or more features of the patient.

In an aspect of the disclosure, the one or more tables further comprises a system matrix associated with available positions for the upper cap and/or angles. The processor may select the system matrix associated with a selected position and/or angles for use in image reconstruction.

In an aspect of the disclosure, the processor may be in operative communication with the detection modules. The processor may process a plurality of supervised machine learning algorithms configured to perform three dimensional (3D) gamma ray localization. The processor may correct for mispositioned line-of responses (LORs) due to Compton scatter by performing Compton scatter recovery using depth of interaction (DOI) information.

In other aspects of the disclosure, the device may comprise an upper portion and a lower portion, the upper portion rotatably connected with the lower portion, the upper portion and the lower portion comprising one or more detection modules. When closed, the upper portion and lower portion may form a cavity for a patient and a patient support. When rotated to open, the patient may be inserted into the device.

In an aspect of the disclosure, the upper portion may comprise wings, respectively operably connected to the upper cap. The wings may be rotatably connected with the upper cap.

In other aspects of the disclosure, disclosed is a method of performing a positron emission tomography (PET) scan. The method comprise determining a position(s) of a cap and/or angles of at least one wing based on actual measurements of at least one feature of a patient to be inserted into a cavity of a device, moving at least one wing and/or moving the upper cap and/or lower cap, selecting a system matrix used for image reconstruction based on the determined position(s), acquiring a PET scan; and generated an image based on information from the PET scan and the system matrix.

BRIEF DESCRIPTION OF THE DRAWINGS

FIG. 1a is a transaxial view illustrating transaxial length of caps, $a_{cap}$, and wings, $a_{wing}$, rotation angle of wings relative to the cap, q, and distance between each cap and the centerline, $h_{cap}$, where $a_{cap}$ and $a_{wing}$ refer to a transaxial length of the plate covered by detector modules The orange star represents the isotropic point source used to calculate a solid angle. FIG. 1b is a projection into coronal plane, and illustrates longitudinal length b of plates;

FIG. 6a is a diagram of an example of a detector module in accordance with aspects of the disclosure;

FIG. 6c is a diagram showing a matrix of detector modules on a cap or a wing in accordance with aspects of the disclosure;

FIG. 9 is a transaxial view illustrating the caps and wings of a PET scanner in accordance with other aspects of the disclosure;

FIGS. 10a and 10b are diagrams of a portion of a PET system in accordance with other aspects of the disclosure in different positions;

FIG. 12a is a diagram of a portion of a PET system in accordance with other aspects of the disclosure;

FIGS. 16a and 16b are examples of look-up tables in accordance with aspects of the disclosure;

FIG. 18 is a table showing features of a PET scanner in accordance with aspects of the disclosure verses a PET scanner of Biograph Vision®.

DETAILED DESCRIPTION

The following detailed description of aspects of the disclosure are made in reference to the accompanying figures. Explanation about related functions or constructions known in the art are omitted for the sake of clearness in understanding aspects of the disclosure to avoid obscuring the disclosure with unnecessary detail.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described. For purposes of the description hereinafter, the terms "upper", "lower", "right", "left", "vertical", "horizontal", "top", "bottom", and derivatives thereof shall relate to a scanner relative to a floor and as it is oriented in the figures.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

Figure 1A:
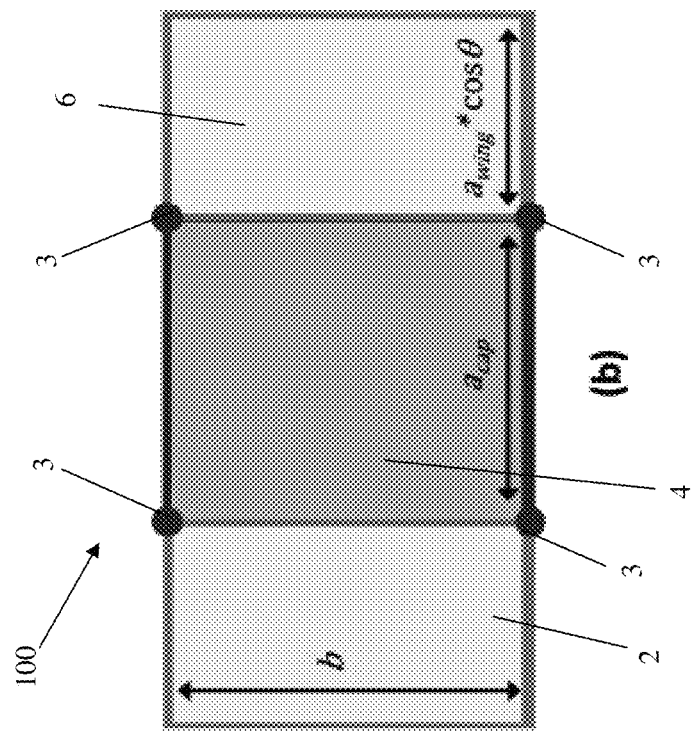
FIGS. 1a and 1b are diagrams showing geometry of a PET scanner in accordance with aspects of the disclosure.
Figure 1B:
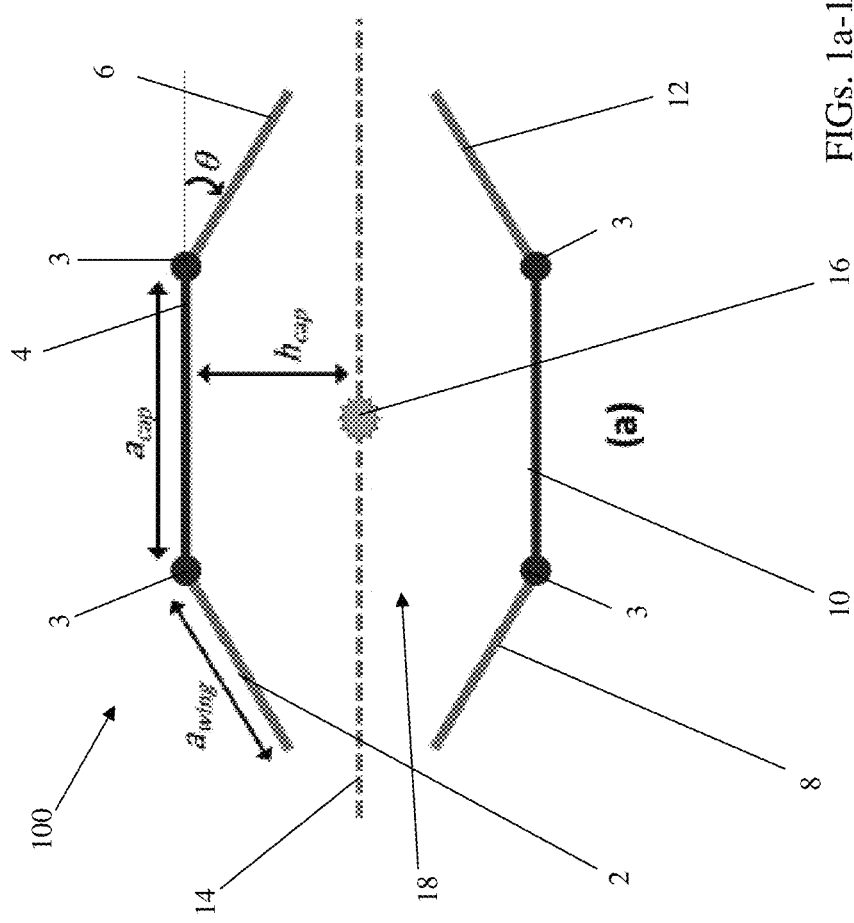

FIGS. 1a and 1b are diagrams showing geometry of a PET scanner 100 according to aspects of the disclosure. The scanner 100 can be a component of a PET system. The PET system may further comprise additional components not shown in the figures. Certain additional components are described herein in further detail.

FIG. 1a is a transaxial view illustrating transaxial length of an upper, left wing 2, an upper cap 4, $a_{cap}$, and an upper, right wing 6. The upper, left wing 2, upper cap 4 and upper, right wing 6 collectively form an upper portion. In an aspect of the disclosure, the upper, left wing 2 may be rotatably connected to the upper cap 4. The upper, left wing 2 may be connected to the upper cap 4 via a hinge 3, which can be any suitable structure that allows for relative rotation between the upper, left wing 2 and the upper cap 4. In an aspect of the disclosure, the upper, right wing 6 may be rotatably connected to the upper cap 4. For example, the upper, right wing may be connected to the upper cap 4 via hinge 3, which can be any suitable structure that allows for relative rotation between the upper, right wing 6 and the upper cap 4.

Also seen in FIG. 1a is a transaxial view of lower, left wing 8, a lower cap 10, and a lower, right wing 12. The lower, left wing 8, lower cap 10 and lower, ring wing 12 collectively form a lower portion. In an aspect of the disclosure, the lower, left wing 8 may be rotatably connected to the lower cap 10. For example, the lower, left wing 8 may be connected to the cap via hinge 3, which can be any suitable structure that allows for relative rotation between the lower, left wing 8 and the lower cap 10. In an aspect of the disclosure, the lower, right wing 12 may be rotatably connected to the lower cap 10. For example, the lower, ring wing 12 may be connected to the lower cap via hinge 3, which can be any suitable structure that allows for relative rotation between the lower, right wing 12 and the lower cap 10. Rotatably connected includes direct connection or indirect connection such as via supports or covers (including mobile upper support 505 and fixed lower support 510), e.g., an intermediary. The angle of rotation may be with respect to horizontal. In other aspects, the angle may be the complementary angle. Rotatably connected is an example of operably connected.

As can be seen, the upper cap 4 is at a distance, $h_{cap}$, from a centerline 14. The centerline 14 is substantially equidistant between the upper cap 4 and the lower cap 10. The orange star 16 is a representation of the isotropic point source used to calculate a solid angle and also represents a longitudinal axis.

In an aspect of the disclosure, the scanner 100 as shown in FIG. 1a may have five degrees of freedom, enabling the scanner 100 to mostly conform to the shape of a mammal patient and/or a specific organ/area of that mammal patient. The mammal can include but is not limited to primates (e.g.; human and nonhuman primates), experimental animals (e.g.; rodents such as mice, rats, etc.), farm animals (such as cows, hogs, sheep, horses etc.), and domestic animals (such as dogs, cats, etc.). The five degrees of freedom may be (1) rotation of the upper, left wing 2 relative to the upper cap 4; (2) rotation of the upper, right wing 6 relative to the upper cap 4; (3) rotation of the lower, left wing 8 relative to the lower cap 10; (4) rotation of the lower, right wing 12 relative to the lower cap 10; and (5) vertical movement of the upper cap 4 and/or the lower cap 10 nearer or further from each other.

Figure 5:
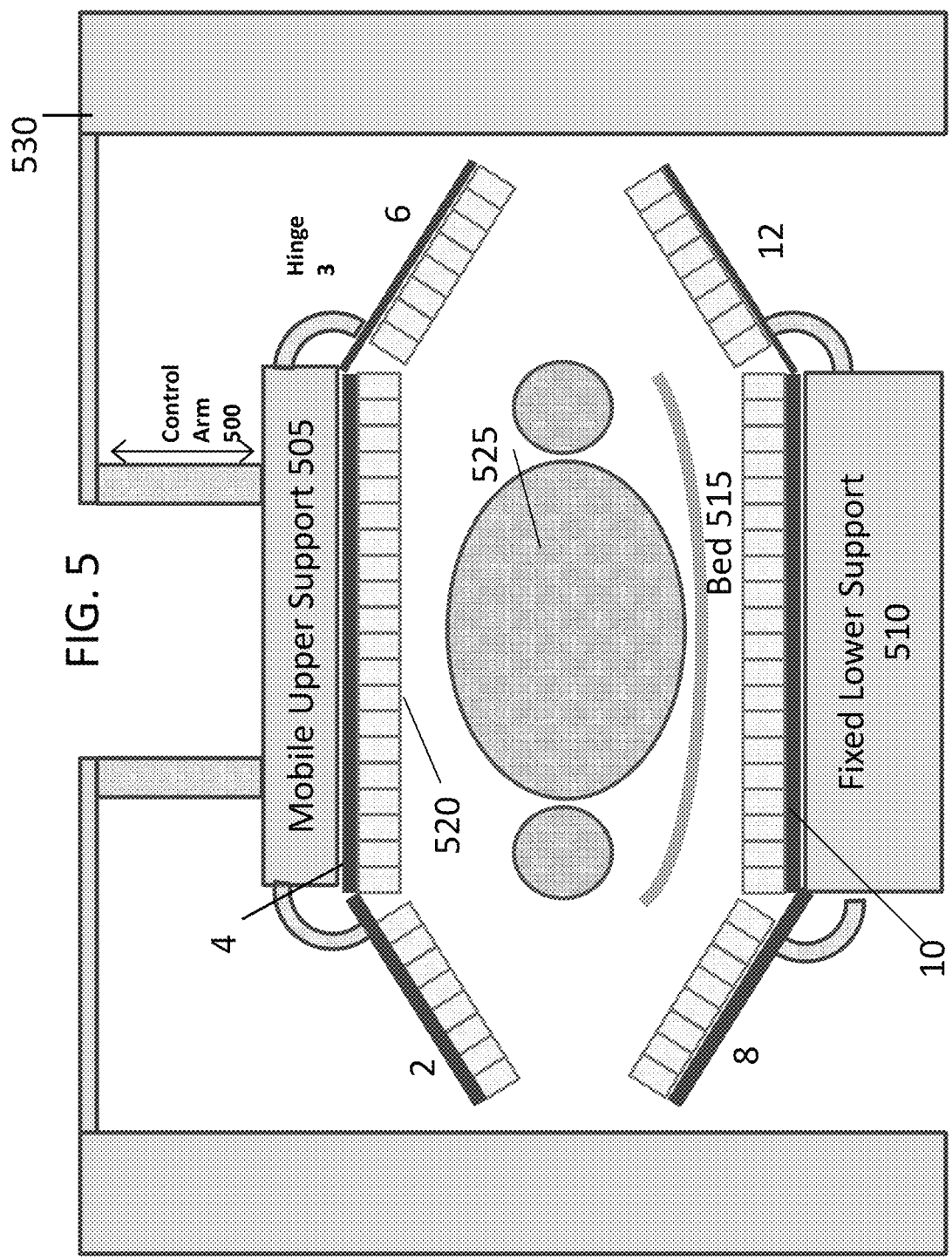
FIG. 5 is a diagram of a portion of a PET system in accordance with aspects of the disclosure.

FIG. 5 is a transaxial view of the scanner of FIG. 1a showing additional details and certain supports of the system. As shown in FIG. 5, the upper portion may also comprise a mobile upper support 505. The mobile upper support 505 may be attached to the upper cap 4. In an aspect of the disclosure, the upper cap 4 may be a plate such as a cooling plate or a cold-plate. The mobile upper support 505 may be any mechanical structure capable of supporting the upper cap 4, and upper wings 2, 6 and the respective detection modules 520. FIG. 5 depicts the mobile upper support 505 and upper cap 4 (plate) as separate elements attached to each other, however, in other aspects of the disclosure, the upper cap 4 may be made thicker such that the upper cap 4 is also mobile upper support 505. In an aspect of the disclosure, wires and circuitry for the PET system 1550 may be incorporated on or into the mobile upper support 505. The scanner 100 may also comprises tower supports 530 and one or more control arms 500. The tower supports 530 may have a column structure. The control arm(s) 500 may extend from the column structure. The tower supports 530 and control arms 500 support the mobile upper support 505 while enabling movement.

In other aspects of the disclosure, the tower supports 530 may be omitted and the control arm(s) 500 may be directly connected to a ceiling of a room where the scanner 100 is located. In other aspects of the disclosure, the control arm(s) 500 may be wall mounted.

The control arm(s) 500 controls the position of the upper portion, e.g., upper cap 4 and the upper wings 2, 6 (and mobile upper support 505).

In an aspect of the disclosure, the control arms(s) 500 may be manually moved by an operator to change the vertical position of the upper portion. In an aspect of the disclosure, the control arm(s) 500 may have a plurality of set positions available for movement. For example, the control arm(s) 500 may have a plurality of latch points where an operator may move the control arm between points and subsequently latch. In an aspect of the disclosure, the control arm(s) 500 may comprise a railing system with one or more mounts where the upper portion is mounted to the mount(s) (via the mobile upper support 505). The railing system may comprise a plurality of openings, each having a different height. The control arm(s) 500 may further comprise a knob or pin which can be pushed or screwed into the openings to latch or lock in position or removed from the openings to enable movement to a different position.

In other aspects of the disclosure, the control arm(s) 500 may allow for movement to any position. For example, the control arm(s) 500 may have slides or a railing system with one or more mounts that may be locked in any position. The upper portion (via the mobile upper support 505) may be mounted to the one or more mounts. The set position may be monitored and reported to a processor 1500.

In other aspects of the disclosure, the control arm(s) 500 may be motorized. The motor may be a DC or AC motor and controlled by a motor controller 1515. The type of motor controller 1515 used may depend on the type of motor. In accordance with this aspect of the disclosure, a processor 1500 may command the motor controller 1515 to control the position to one of a plurality of preset positions (e.g., $h_{cap}$). In other aspects, the position may be defined as the distance between the centerline 14 and the bottom of the detection modules on the upper cap. In other aspects, the position may be defined as the distance between the mobile upper support 505 and the centerline 14. In other aspects of the disclosure, the position may be defined as the distance between the lower cap and the upper cap or the distance between the bottom of the detection modules on the upper cap and the top of the detection modules on the lower cap. In other aspects of the disclosure, the position may be defined as the distance between the mobile upper support 505 and the fixed lower support 510.

In other aspects of the disclosure, the positions may not be preset and the motorized control arm(s) 500 may be moved to any height from a first height to a second height (maximum range of motion). In some aspects of the disclosure, the scanner 100 may also include an encoder or position detector to report the actual position of the upper portion to the processor 1500.

As depicted in FIG. 5, there are two control arms 500, one on the left side and another on the right side. In this configuration, the processor 1500 may control the motor controller 1515 to simultaneously move the position of both control arms 500. The same motor controller 1515 may be used for both control arms 500. In other aspects, each control arm 500 may have its own motor controller 1515.

In other aspects, only one control arm 500 may be used. The control arm 500 may be positioned in the center of the upper cap 4 (mobile upper support 505).

As described above, the upper wings 2, 6 may be rotated with respect to the upper cap 4 (mobile upper support 505) and connected to the same via hinge(s) 3. As shown in FIG. 5, a portion of upper wings 2, 6 is not covered with detection modules 520, e.g., an extended section. This enables the upper wings 2, 6 to move with respect to the upper cap 4 while minimizing points that are not covered by the detection modules 520. The extended sections may be only on the ends of the wings 2, 6 with respect to a longitudinal axis of the scanner.

In an aspect of the disclosure, the hinges 3 may be attached to respective ends of the mobile upper support 505 (or end supported or covers) with respect to the longitudinal axis of the scanner (such that the wings, 2, 6 are operably connected to the upper cap 4). In an aspect of the disclosure, the hinges 3 may be manually actuated to change the angle of the upper wings 2, 6 relative to the upper cap 4 (and mobile upper support 505). For example, the hinges 3 may be a latch hinge. One plate of the hinge may be coupled to the mobile upper support 505 and another movable plate coupled to the upper wings 2, 6, respectively. The latch hinge may have a push button to release/lock the hinge. In this aspect, the operator may manually control the angle of the upper wings 2, 6 relative to the upper cap 4. In some aspects of the disclosure, additional hinges may be positioned between the ends to further support the weight of the upper wings 2, 6. In other aspects of the disclosure, the latch hinge may be a bar hinge have a controllable angle. The fixed portion of the bar hinge may be coupled to the mobile upper support 505 and the moveable portion attached to the upper wing 2, 6, respectively.

In other aspects of the disclosure, the hinges 3 may be torque hinges.

In other aspects of the disclosure, the hinges 3 also may comprise two plates, a fixed plate coupled to the mobile upper support 505 and a moveable plate coupled to the upper wings, 2, 6, respectively. The moveable plate may be rotated by turning a screw which connects the moveable plate with the fixed plate.

Figure 14:
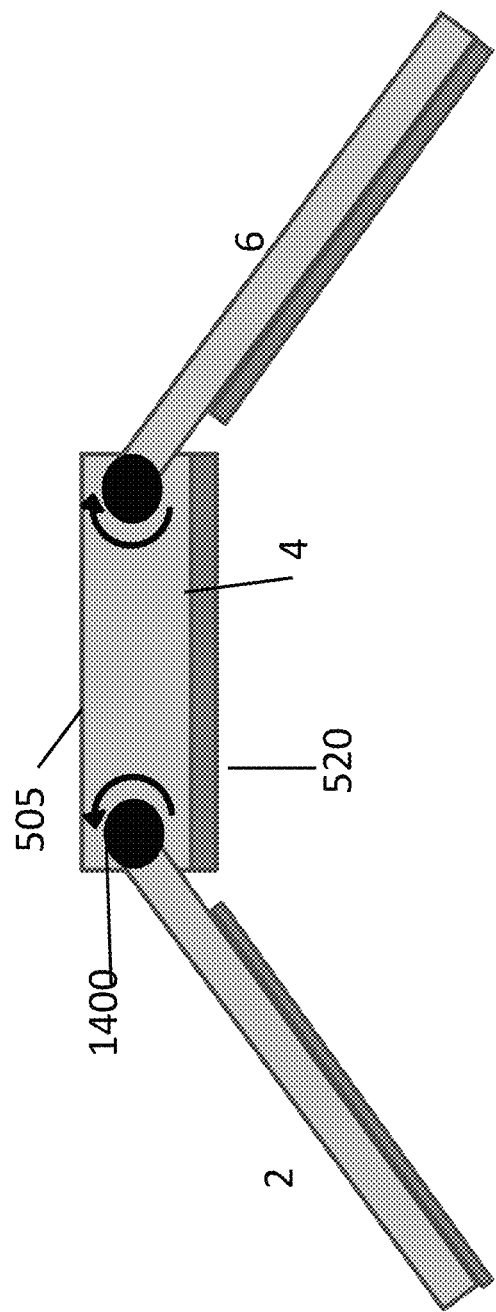
FIG. 14 is a diagram showing a motorized hinge for the wings in accordance with aspects of the disclosure.

In other aspects of the disclosure, the hinge may be a motorized hinge 1400 as shown in FIG. 14. FIG. 14 shows an end view of the mobile upper support 505. In an aspect of the disclosure, the motorized hinge 1400 may be a rotational stage. The stage base may be fixed to the respective ends the mobile upper support 505. The upper wings 2, 6 may be fixed to the rotating stage, respectively. The rotation of the rotational stage rotates the upper wings 2, 6. Motorized rotation stages are available from Thorlabs, Inc. Newton, New Jersey. The motorized rotational stage includes a motor, such as a micro-stepping motor. The position of the rotation stage may be controlled by a motor controller 1510, such as a benchtop stepper motor controller available from Thorlabs, Inc. Newton, New Jersey. In an aspect of the disclosure, a processor 1500 may issue a command to the motor controller 1510 to move the rotation state to a particular angle from a plurality of preset angles. In other aspects, the angles may not be preset. Each motorized hinge 1400 per wing may be simultaneously controlled to maintain the wing level. In an aspect of the disclosure, the motorized hinge 1400 may also include an encoder which detects the actual angle of the wing and feedback the same to one or more of the motor controller 1510 and the processor 1500. Similar to above, additional hinges may be positioned between the ends of each wing (e.g., upper wings, 2, 6), respectively, and mobile upper support 505 as needed depending on the weight of the wings.

The lower portion of the scanner may further comprise a fixed lower support 510. The lower cap 10 (plate) may be attached to the fixed lower support 510.

FIG. 5 depicts the fixed lower support 510 and lower cap 10 (plate) as separate elements attached to each other, however, in other aspects of the disclosure, the lower cap 10 may be made thicker such that the lower cap 10 is also the fixed lower support 510. In an aspect of the disclosure, wires and circuitry for the PET system 1550 may be incorporated on or into the fixed lower support 510. The fixed lower support 510 is positioned on a floor of a room. The fixed lower support 510 also supports a patient's bed 515 and the patient 525 when the patient is in the scanner 100.

The lower wings 8, 12 may be rotated with respect to the lower cap 10 (lower fixed support 510) and connected to the same via hinge(s) 3 (and also via the lower fixed support 510, e.g., lower wings 8, 12 operably connected to the lower cap). The connections and hinges may be the same as described above for the upper wings 2, 6.

The upper portion and the lower portion form a cavity 18 for the patient 525.

Figure 7:
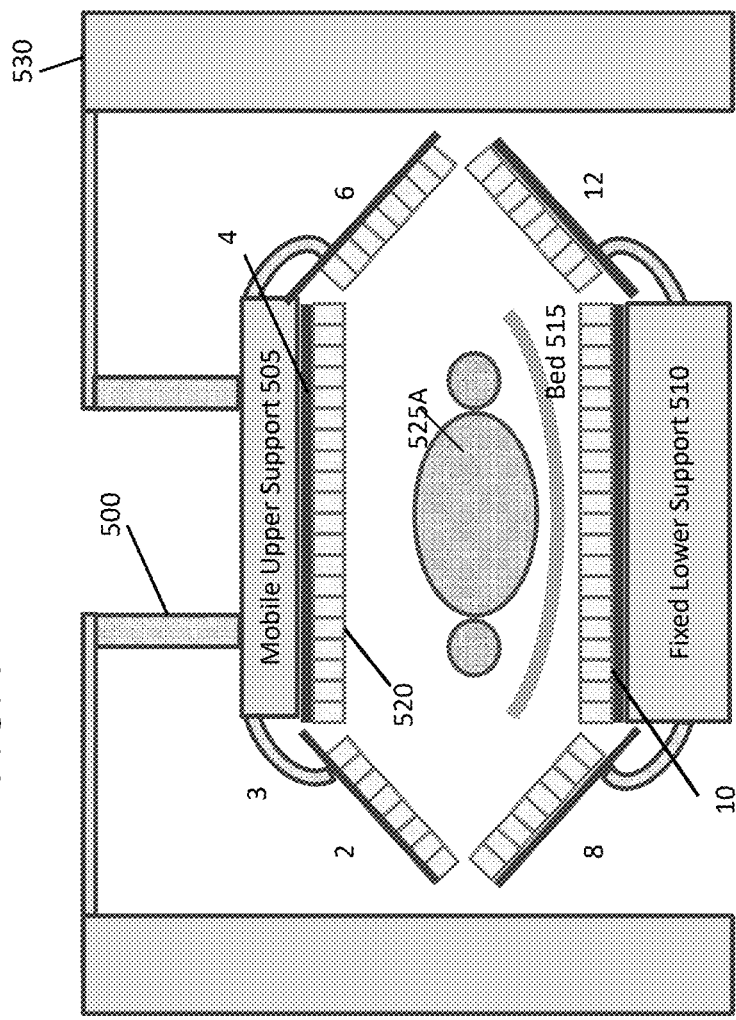
FIG. 7 is a diagram showing the PET scanner of FIG. 5 in a first position in accordance with aspects of the disclosure.
Figure 8:
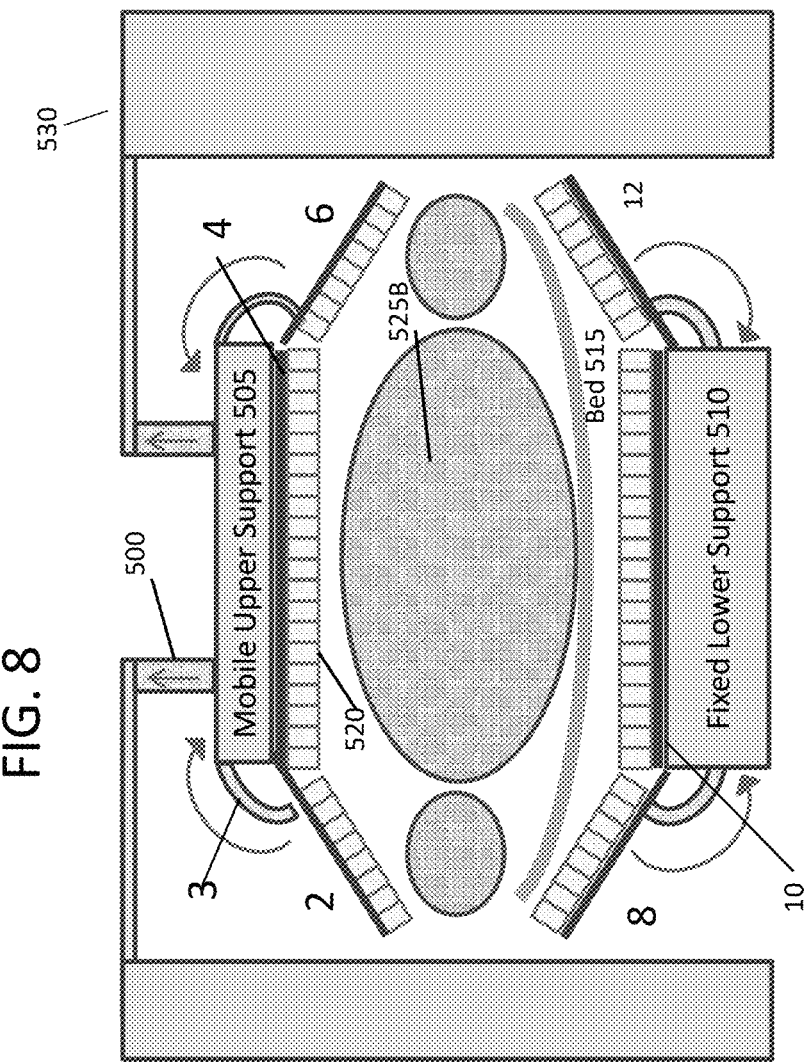
FIG. 8 is a diagram showing the PET scanner of FIG. 5 in a second position in accordance with aspects of the disclosure.

As described above, the geometry of the scanner 100 may be adapted to a patient's shape (size) by adjusting the height of the upper portion (such as the height of the upper cap 4) and angles of the upper wings 2, 6 relative to the upper cap 4 and angles of the lower wings 8, 12 relative to the lower cap 10. For example, as shown in FIG. 7, the upper cap 4 may be lowered and the wings 2, 6, 8, 12 rotated toward vertical for a small patient 525A (target positions). However, as shown in FIG. 8, the upper cap 4 may be raised and the wings, 2, 6, 8, 12 rotated toward horizontal for large patient 525B (target positions). The upper cap 4 may also be raised to enable a patient 525 to be inserted into the scanner, e.g., cavity, and subsequently lowered to a target position.

In other aspects of the disclosure, the wings 2, 6 may be fixed with respect to the upper cap 4 (fixed angle). In this aspect of the disclosure, the wings 2, 6 may be connected to the cap 4 via connector 3A (see FIGS. 10a and 10b).

FIG. 9 is a diagram showing a transaxial view of the caps 4, 10 and wings 2, 6, 8, 12. In this view, the detector modules 520 have been omitted for simplifying the figure. However, the detector modules 520 would be attached to the shaded portion of the caps 4, 10 and wings 2, 6, 8, 12. The non-shaded portion is where the caps 4, 10 and wings 2, 6, 8, 12 are respectively connected. In an aspect of the disclosure, each of the caps 4, 10 and wings, 2, 6, 8, 12 include a plate(s). In an aspect of the disclosure, the plate may be bent to form the cap 4 and wings 2, 6 (another plate may be bent to form cap 10 and wings 8, 12). In other words, the cap 4 and wings 2, 6 may be integral and formed from a single plate. In other aspects of the disclosure, the plates of the wings 2, 6 and cap 4 may be welded together (similarly the plates of the cap 10 and wings 8, 12). In another aspect of the disclosure, the upper portion and the lower portion may have end supports or covers (with respect to the longitude axis), respectively, and each plate may be screwed into or attached to the end supports or covers (such as shown in the example in FIG. 12b). In another aspect of the disclosure, instead of the upper portion comprising separate wings 2, 6 and cap 4, the upper portion may comprises a continuous arc-shaped plate. Similarly, the lower portion may comprise a continuous arc-shaped plate. The term "operably connected" used herein refers to any of the above examples. The fixed angle is identified in FIG. 9 as "Angle".

Figure 10B:
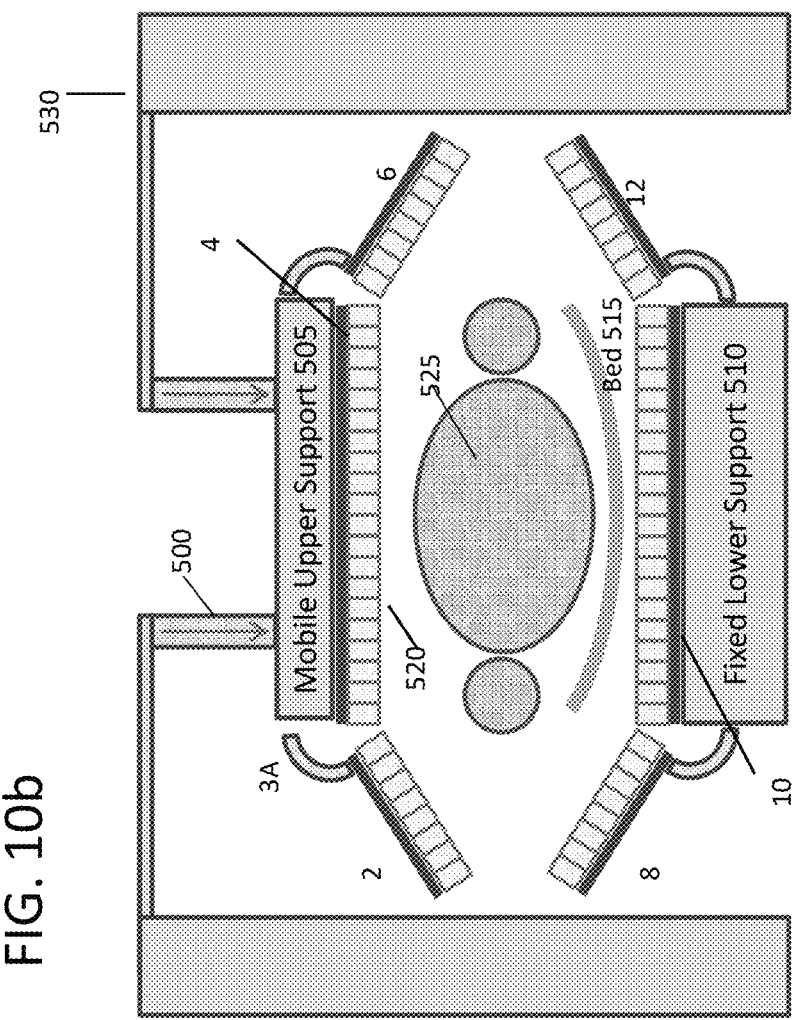

In other aspects of the disclosure, only the height (relative distance) of the upper portion (such as the height of the upper cap 4) may be adjusted as described above. For example, as shown in FIG. 10A, the upper portion (such as the height of the upper cap 4) may be raised to enable the patient 525 to be inserted and positioned and subsequently lowered as shown in FIG. 10b to a target position to maximize conformity with the patient 525.

In other aspects, the scanner 100 may only have two positions: opened and closed. An example of the opened position is shown in FIG. 10a. When the scanner 100 is closed, the scanner 100 may have a closed hexagonal shape as viewed from the transaxial direction (hexagonal cavity). In an aspect of the disclosure, the side length (transaxial length) may be about 26 cm. The angle of the wings 2, 6, 8, 12 with respect to horizontal may be between about 25° and about 55°. In other aspects, the angle may be between about 35° to about 45°. In other aspects of the disclosure, the angle may be about 40°.

The closed geometry may be set such that it can accommodate a male with 95% measurement for bust depth, which about 28.2 cm, and forearm-forearm breath of about 61.5 cm as the cavity with the field-of-view has a horizontal opening of about 65.8 cm at the midline and a vertical opening of about 33.4 cm at the center.

In other aspects, the scanner 100 may also comprise sides 114, 116 (left side and right side), respectively. The sides 114, 116 may be coupled to the support tower 530A. The sides 114, 116 may be moveably attached to the support tower 530A. In an aspect of the disclosure, the sides 114, 116 may be attached via a control arm 500A. The control arm 505A may be similar to described above (manually moved or motorized movement). In an aspect of the disclosure, the control arm 505A may be similar to a wall mount for a television.

Figure 11:
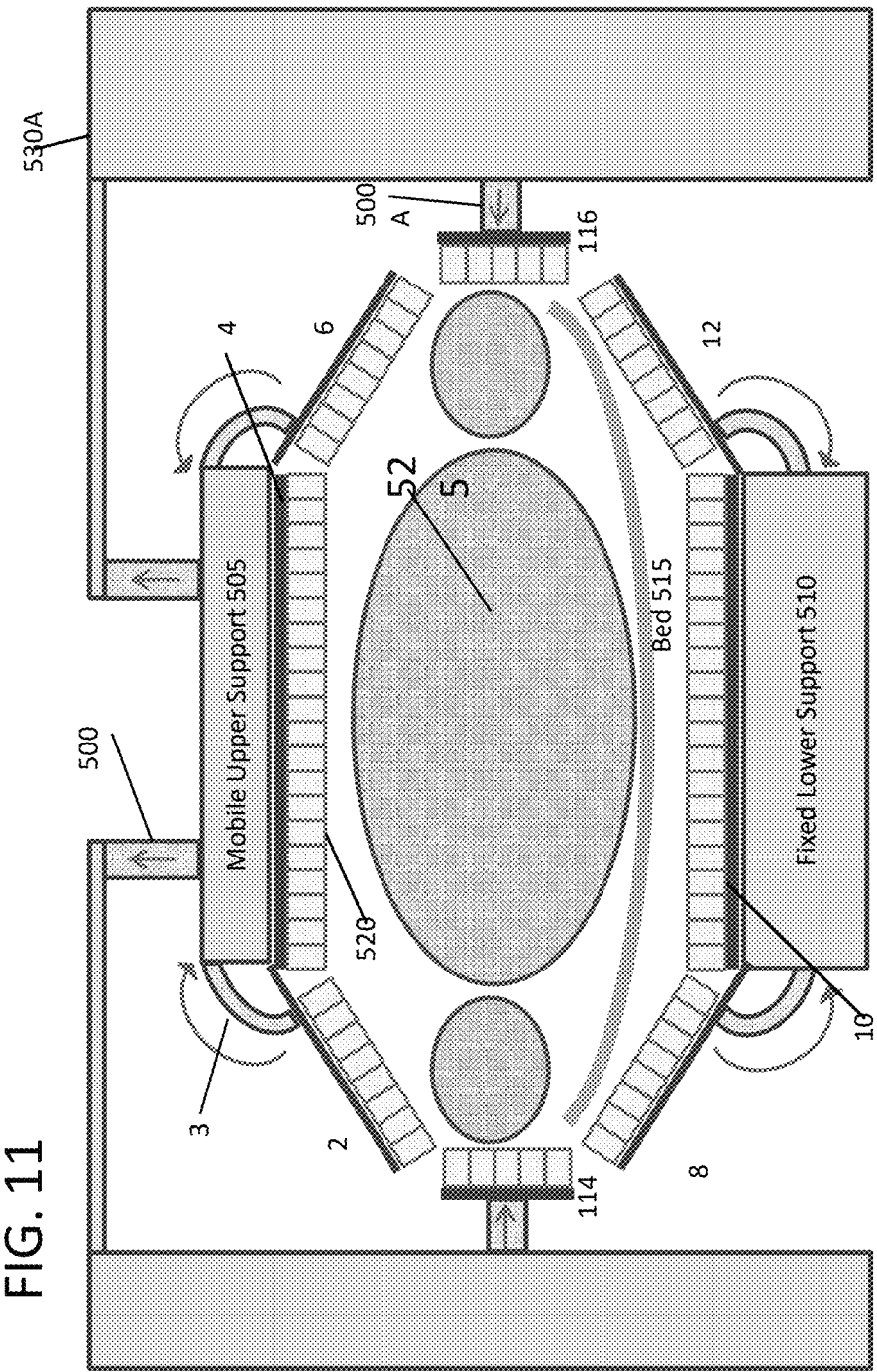
FIG. 11 is a diagram of a portion of a PET system in accordance with other aspects of the disclosure.

In some aspects, the sides 114, 116 may be used for large patients in order to close the cavity 18 such that detection modules 520 substantially surround the patient 525. For example, for large patients, the upper portion may be raised and the wings 2, 6, 8, 12 rotated toward horizontal such that there is a large gap between the upper portion and the lower portion. The gap may lead to reduce coverage. In this aspect of the disclosure, the sides 114, 116 may be positioned in the gap to provide substantially 3600 of coverage. The sides 114, 116 may be moved adjacent to the patient as shown in FIG. 11. When the sides 114, 116 are not used in the scan, the sides 114, 116 may be moved away (toward) toward the support tower 530A. In an aspect of the disclosure, the sides 114, 116 may have only two positions: engaged or away. In other aspects of the disclosure, the sides 114, 116 may be moved in any preset position as needed, e.g., a target position. In other aspects, the position may not be preset.

Figure 12B:
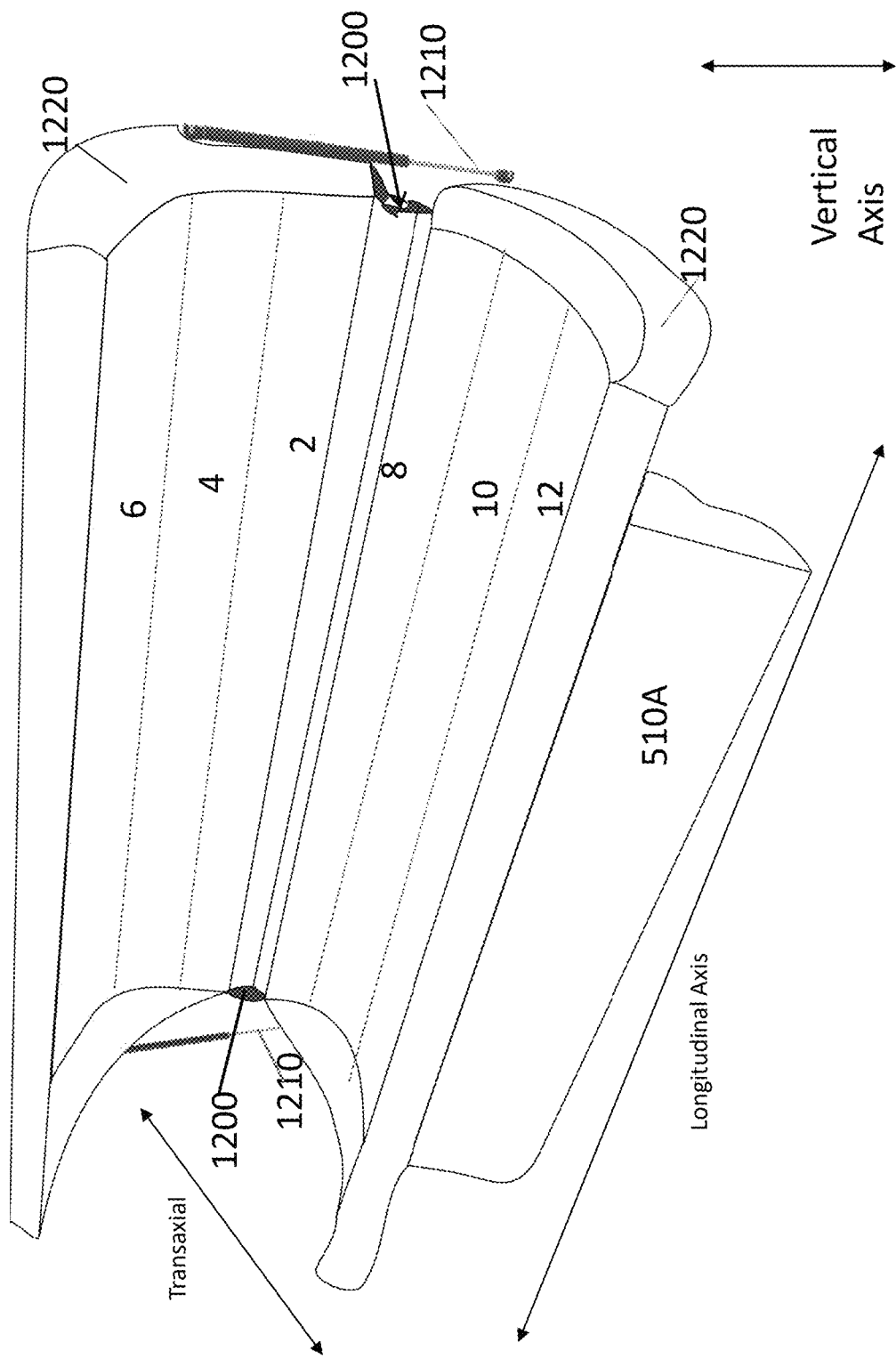
FIG. 12b is a perspective view of the PET scanner in accordance with aspects of the disclosure.

In other aspects of the disclosure, the upper portion of the scanner 100 may be rotated with respect to the lower portion. The upper portion may be rotatably connected with the lower portion via hinges 1200. The hinges 1200 may be connected on respective ends of the mobile upper support 505A (side covers or supports such as shown in FIG. 12b 1220). The hinges 1200 may be an elbow connector or joint. In some aspects, the hinges 1200 may be a plastic joint with one end connected to the fixed lower support 510A via a connection means such as a screw and another end connected to the mobile upper support 505A.

In an aspect of the disclosure, the plates (caps 4, 10 and wings 2, 4, 8, 12) may be screwed into the covers or support 1220. The plates (caps 4, 10 and wings 2, 4, 8, 12) are identified by dotted lines in FIG. 12b.

The upper portion may be connected with the lower portion via shocks and pistons 1210. The shocks and pistons 1210 may be used to maintain the upper portion rotated in a fixed position such as an opened position relative to the lower portion.

The wings 6, 12 may also be attached to a cover or support (such as a front cover). Similarly, wings 2, 8 may also be attached to a cover or support (such as a back cover (as viewed in FIG. 12b).

As depicted in FIG. 12a, the upper portion (including the mobile upper support 505A) may be rotated counter-clockwise, such that the mobile upper support 505A may be substantially vertical to enable a patient 525 to be inserted into the scanner 100 and subsequently rotated clockwise into the position shown in FIG. 12a.

Additionally, as depicted in FIG. 12a, upper wings 2, 6 have a fixed angle with respect to the upper cap 4 and lower wings 8, 12 have a fixed angle with respect to the lower cap 10 and may be attached via connector 3A. However, in other aspects of the disclosure, the wings 2, 6, 8, 12 may be able to rotate as described above. In another aspect of the disclosure, instead of the upper portion comprising separate upper wings 2, 6 and upper cap 4, the upper portion may comprise a continuous arc-shaped plate. Similarly, the lower portion may comprise a continuous arc-shaped plate.

Also, as depicted in FIG. 12a, the hinges 1200 are on the left side. However, in other aspects of the disclosure, the hinges 1200 may be on the opposite side and the rotation may be reversed, e.g., clockwise to open and counter-clockwise to close.

Each of the upper, left wing 2, the upper cap 4, the upper, right wing 6, the lower, left wing 8, the lower cap 10, and the lower, right wing 12 has a plurality of detection modules 520. Each detection module 520 is represented in the figures as a rectangle.

Any depth-encoding detection module may be used as the detection modules 520 which are capable of providing DOI information. In an aspect of the disclosure, the detection modules 520 are capable of detecting about 511 keV photons and localizing their interaction with a scintillator crystal in three-dimensions.

FIG. 6a depicts an example of a detection module 520 which may be used in accordance with aspects of the disclosure. The detection module 520 may include an electronic connector board (PCB) 600 and detection elements such as a SiPM pixels (SiPM array) 605, scintillator crystals (scintillator array) 610 and a light guide 615. The electronic connector board 600 may be mounted directly to the plates, e.g., caps 4, 10, and wings 2, 6, 8, 12. The light guide 615 faces the patient 525. Thus, in the upper portion the light guide faces downward and in the lower portion the light guide faces upward. In an aspect of the disclosure, each detection module 520 has its own electronic connector board (PCB).

One example of the detection module 520 which may be used is discussed in more detail in U.S. patent application Ser. No. 16/899,636, the entire contents of which are incorporated by reference. As described in U.S. patent Ser. No. 16/899,636, a detection module 520 may include at least the following components: a scintillator array comprising a plurality of scintillator crystals 610; a plurality of detecting elements provided on one end of the scintillator array (such as the SiPM array 605); and a plurality of prismatoids provided on the other end of the scintillator array (which is the light guide 615). Each prismatoid of the plurality of prismatoids is configured to redirect particles between ends of scintillator crystals of the scintillator array. For example, ends of a first group of scintillator crystals of the scintillator array are configured to direct particles to a first detecting element of the plurality of detecting elements, and wherein ends of a second group of scintillator crystals of the scintillator array are configured to direct particles to a second detecting element substantially adjacent to the first detecting element. Each of these components is discussed in more detail in U.S. patent application Ser. No. 16/899,636, the entire contents of which are incorporated by reference.

In an aspect of the disclosure, the plurality of prismatoids of each of the one or more detection modules are oriented to the cavity 18 that is substantially coaxial with axis 16 as shown in the figures (see FIG. 1a), and is substantially enclosed circumferentially by the upper, left wing 2, the upper cap 4, the upper, right wing 6, the lower, left wing 8, the lower cap 10, and the lower, right wing 12.

Figure 6B:
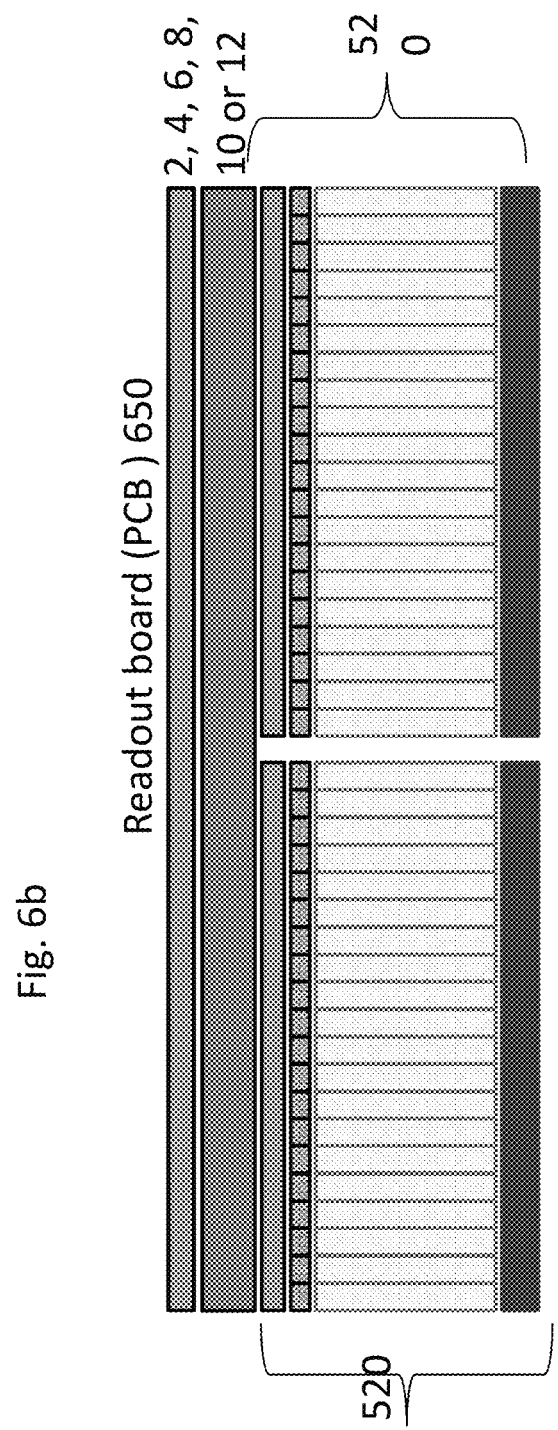
FIG. 6b is a diagram of a portion of a plate showing two adjacent detector modules in accordance with aspect of the disclosure.

FIG. 6b illustrates a portion of the plate showing two adjacent detection modules 520. A similar detection plate may be used for the caps 4, 10 and/or wings 2, 6, 8, 12. Each electronic connector board 600 may be mounted directly to the plate. The plate may be a cold-plate such as a metal plate with copper pipes. On the opposite side of the plate, an electrical readout board (PCB) 650 may be attached. In an aspect of the disclosure, the same electrical readout board (PCB) 650 may be used for all of the detection modules 520 on the same plate. In other words, the cap 4 may have one electrical readout board 650. In other aspects, one more than electrical readout board (PCB) 650 may be attached to each plate such that multiple detection modules share the electrical readout board (PCB 650) (a subset of all of the detection modules 520). However, in other aspects of the disclosure, each detection module 520 may have its own dedicated readout board (PCB). The readout board 650 may be either wireless or wired to the processor 1500. When there are supports such as the mobile upper support 505/505A or fixed lower support 510A, the readout boards may be attached to the same. The electronic connector board 600 and the readout board 650 may be electrically connected via wires running through the plate. The wires may be in a flexible connector.

FIG. 6c illustrates an example of a plate having a matrix 670 of detection modules 520. The matrix 670 may be a 2-Dimensional array of detection modules 520. The number of detection modules 520 in the array may be based on the application and are not limited to the example depicted in FIG. 6c. As depicted, the matrix 670 has 8 detection modules in the transaxial direction. This is similar to the number of detection modules shown for the wings 2, 6, 8, 12 in the figures.

As depicted in the example in FIG. 5, the plate for the cap 4, 10 has more detection modules 520 in the transaxial direction than the wings. 2, 6, 8, 12. However, the disclosure is not limited to more detection modules in the caps 4, 10 than the wings 2, 6, 8, 12.

In other aspects of the disclosure, instead of being attached to each of the wings, 2, 6, 8 and 12 and caps 4, 10, the detection modules 520 may be attached to only a subset thereof. Additionally, in other aspects, the detection modules 520 can be in any location, and in any suitable pattern.

FIG. 1b is a top view of the scanner 100, such that the upper, left wing 2, the upper cap 4, and the upper, right wing 6 are each visible. In this coronal plane, the longitudinal length of the scanner 100 is shown as b, which can be created into any suitable length.

Figure 15:
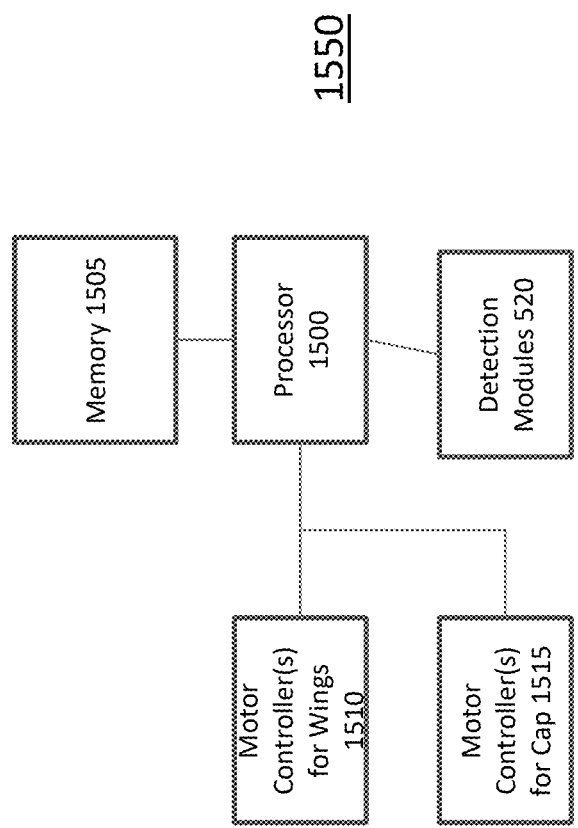
FIG. 15 is a block diagram of a PET system in accordance with aspects of the disclosure.

FIG. 15 is a block diagram showing certain components of the PET system 1550 in accordance with aspects of the disclosure. The system 1550 comprises a processor 1500, memory 1505 and the detectors 520. The processor 1500 may be an FPGA. In other aspects of the disclosure, the processor 1500 may be a microcontroller or microprocessor or any other processing hardware such as a CPU or GPU. Memory 1505 may be separate from the processor 1500 (or integrated in the same). For example, a microcontroller or microprocessor includes at least one data storage device, such as, but not limited to, RAM, ROM and persistent storage.

In some aspects, when motion of both the upper cap 4 and wings, 2, 6, 8 and 12 are motorized, the system 1550 may also have a motor controller(s) for the wings 1510 and motor controller(s) for the control arm 500. The system 1500 may also comprise motor controller(s) for the sides 114, 116 (control arm 500A) (the motor controller(s) for the sides are not shown in FIG. 15). When the wings 2, 6, 8 and 12 are fixed, the motor controller(s) for the wings 1510 may be omitted. The processor 1500 may be configured to receive information from the detection modules 520 and reconstruct an image using a reconstruction algorithm stored in the memory 1505. In some aspects, modules within the reconstruction algorithm and a system matrix may be geometry dependent of the scanner 100. The geometric dependent information may be stored in the memory 1505.

In an aspect of the disclosure, the memory 1505 may have one or more look-up tables. Each look-up table may be application specific. For example, the system 1550 may be used for brain scans only as the application. In other aspects, the system 1550 may be used for a whole-body scan. There may be a different look-up tables stored for brain scans and whole-body scans.

FIG. 16a depicts a representation of one of the look-up tables 1650 for a brain scan in accordance with aspects of the disclosure. The look-up table 1650 may include head circumferences. These head circumferences may be typical head circumferences of patients.

The head circumferences are represented in the table 1650 as H1 and H2, where the circumferences are different. For example, head circumferences for the $5^{th}$ to $95^{th}$ percentile of expected patients may be included in the table 1650. A look-up table 1650 having more head circumferences may be used for higher degree of conformity to a patient. For example, the table 1650 may include measurements for every 5% from 5% to $95^{th}$ percentage. In other aspects, the table 1650 may include measurements for every 10%. The table 1650 also includes the target position for the upper cap 4 associated with the measurement. For example, for a head circumference of H1, the target position for the cap 4 may be P1, whereas for head circumstance of H2, the target position for the cap 4 may be P2. The table may also include the position of the wings. For a brain scan, the position may be set such that the wings are set to the maximum angle, e.g., close to vertical for each measurement, such that the wings may move to the closest position to the head.

In some aspects, the table 1650 may also include geometric dependent system matrix for each measurement. The geometric dependent system matrix is represented in the table 1650 as SM1 for H1 an SM2 for H2. Thus, the system matrix may be different for different geometric configurations of the scanner.

In some aspects, the table 1650 may also include geometric dependent modules for the reconstruction algorithm such as geometric dependent normalization parameter.

In other aspects, the table 1650 may not include the system matrix and geometric dependent modules and the same may be calculated in real-time based on the geometry, e.g., P1 and V1 or P2 and V1 . . . .

A similar look-up table 1660 may be used for the whole-body scan. However, instead of measurement of the brain circumference, other features of the patient may be used for the whole-body scan (other measured features). For example, one or more features relevant to the whole-body scan may be bust depth and forearm-forearm breath. The bust depth may be used to determine the position of the upper cap 4 (and in some aspects whether sides 114, 116 are used) and the forearm-forearm breath may be used to determine wings 2, 6, 8 and 12 position (along with the bust depth). In the example, the bust depth is represented by B1 and B2 (different measurements), the forearm-forearm breath is represented by F1 and F2 (different measurements) and the target position of the upper cap is represented by PX and PY, the target position for the wings is represented by VA-VD. The different system matrixes are represented by SMW-SMZ and the different geometric dependent modules are represented by MA-MD.

In other aspects, the table 1660 may not include the system matrix and geometric dependent modules and the same may be calculated in real-time based on the geometry.

Bust depth and forearm-forearm breath for the $5^{th}$ to $95^{th}$ percentile of expected patients may be included in the table 1660. A look-up table 1660 having more measurements may be used for high degree of conformity to a patient. For example, the table 1660 may include measurements for every 5% from 5% to $95^{th}$ percentage or every 10%.

The number of measurements is not limited to the number shown in FIG. 16a or 16b.

The look-up tables 1650 and 1660 may be used when both the upper cap 4 and wings may be moved, however other look-up tables may be used when only the upper cap 4 may be moved. Additionally, other look-up tables may be used when the sides 114, 116 may be moved.

Figure 13:
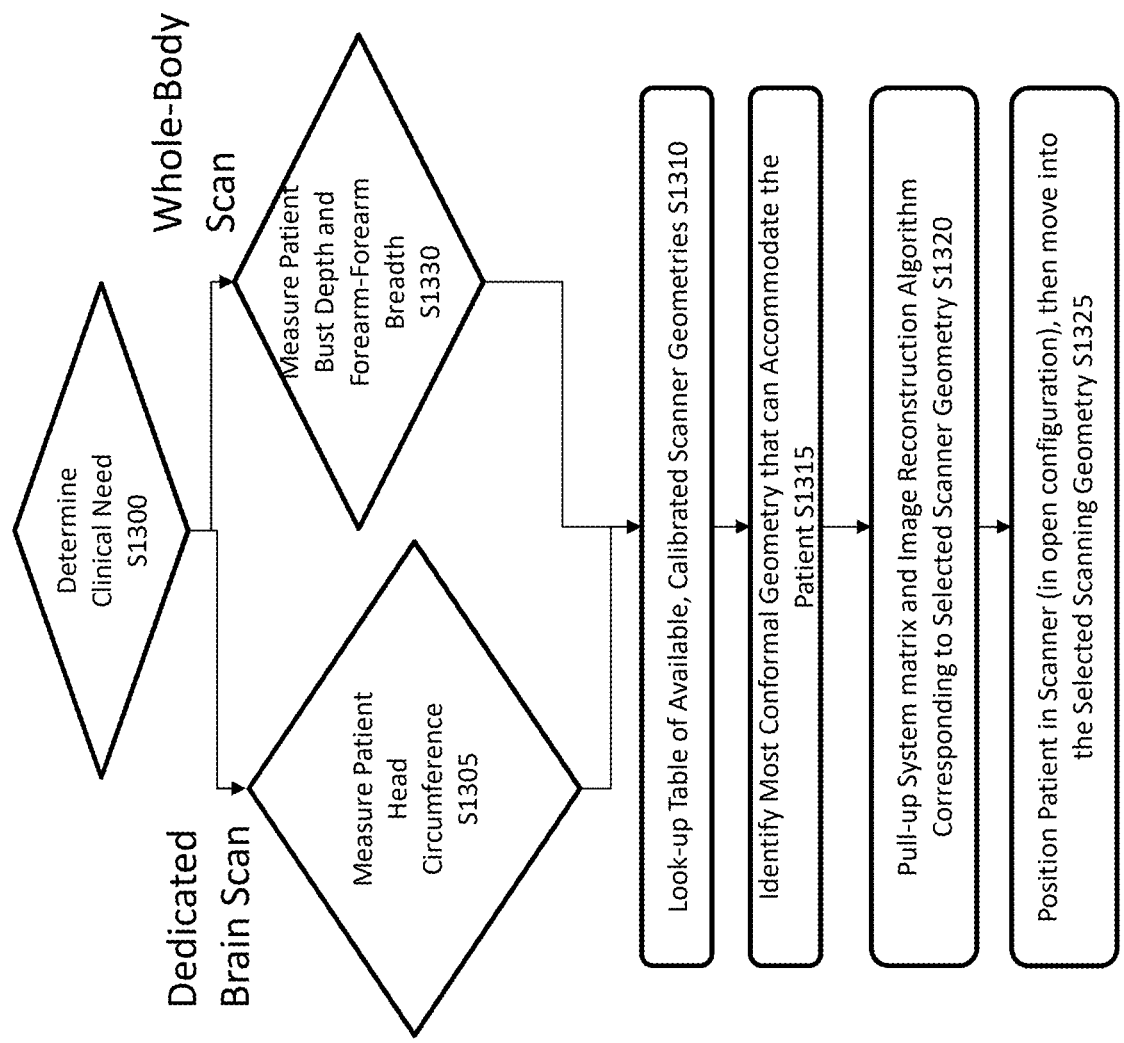
FIG. 13 is a flow chart of a method in accordance with aspects of the disclosure.

FIG. 13 illustrates a flow chart for a method in accordance with aspects of the disclosure. This method includes determining the geometric configuration for the scanner 100 according to one or more measured features of a patient and the application.

At S1300, the application for the PET system 1550 may be determined. As described above, the applications may be a brain scan or a whole-body scan. However, the applications for the PET system 1550 may not be limited to a brain scan or whole-body scan and other applications such as a lower body scan may be used. In this aspect, different measured parameters may be used with different look-up tables. When the application is a dedicated brain scan, the patient head circumference is measured at S1305. In an aspect of the disclosure, if the patient's medical record already contains a measurement of the head circumference, the processor 1500 may retrieve the measurement from electronic patient record. In other aspects, if the patient's medical record already contains the measurement in paper form, the operator may enter the measurement via a user interface (not shown). In an aspect of the disclosure, the operator may measure the patient's head circumference using any known measurement device. The measurement may be input into the processor 1500.

In other aspects, a still image may be taken of the patient and the head circumference determined by the processor 1500 via image processing and estimation.

At S1310, the processor 1500 retrieves the look-up table 1650 from memory 1505. The look-up table may contain available positions for the cap 4 and wings, 2, 6, 8 and 12 (preset positions, which may be calibrated). At S1315, the most conformal geometry is identified. In an aspect of the disclosure, the processor 1500 causes the table 1650 to be displayed on a display (not shown) and the operator identifies the most conformal geometry looking at the table 1650 using the measurement of the brain circumference. If there is a match with the measured brain circumference with a line-item in the look-up table 1650, the corresponding target position is selected (cap position and/or wings). When there is no match and the measured brain circumference with between two line-items in the look-up table 1650, the closest line-item is selected and the corresponding position(s) in the selected line item is/are selected as the target position (cap position and/or wings) (selected preset position). As described above, the scanner may have different ranges of motion, cap 4 movement only, cap 4 movement and wings 2, 6, 8 and 12 movement and cap 4, wings 2, 6, 8, and 12 and sides 114 and 116. Therefore, the target position(s) may be based on which scanner 100 is used.

In other aspects of the disclosure, the look-up table 1650 may not be displayed and the processor 1500 determines the most conformal geometry using the look-up table 1650 based on the measurement of the brain circumference. If there is a match with the measured brain circumference with a line-item in the look-up table 1650, the processor 1500 may select the corresponding target position (cap position and/or wings). When there is no match and the measured brain circumference with between two line-items in the look-up table 1650, the processor 1500 may select the closest line-item and the corresponding position(s) in the selected line item is selected as the target position (cap position and/or wings) (selected preset position).

In other aspects, when other positions for the cap 4 or wings are available, when there is no match and the measured brain circumference with between two line-items in the look-up table 1650, the processor 1500 may interpolate the desired target position using a ratio of positions from the two line items.

At S1320, the processor 1500 determines the system matrix and geometric dependent modules for used in the reconstruction algorithm for the target geometry of the scanner. In an aspect of the disclosure, the processor 1500 may use the look-up table and obtain the corresponding system matrix and geometric dependent modules for the selected line-item. In other aspects, the processor 1500 may calculate the system matrix and the geometric dependent modules based on the target geometry of the scanner. In other aspects, when the processor interpolates the target position, the processor 1500 may adjust the system matrix and geometric dependent modules from the system matrix and the geometric dependent modules corresponding to the two line-items.

At S1325, the scanner 100 is moved to an open position (if not already there), the patient 525 is positioned on the bed 515 and subsequently the scanner 100 is moved to the target geometric position(s).

In an aspect of the disclosure, when the control arm(s) 500 are motorized, the processor 1500 may issue a command to the motor controller 1515 to move the control arm(s) such that the upper cap 4 is moved to the target position. The motor controller 1515 supplies the motor in the control arm(s) the appropriate power such that the control arm(s) 500 move to the target position. In some aspects, the control arm(s) 500 comprises a position sensor and the position sensor reports back to the motor controller 1515 and/or processor 1500 the actual position (feedback).

In an aspect of the disclosure, when the wings 2, 6, 8 and 12 are able to rotate and the hinges are motorized (e.g., 1400), the processor 1500 may issue a comment to the motor controller(s) 1510 for the wings, e.g., stepper motor controller, such that the wing 2, 6, 8 and 12 are moved to the target position(s). The motor controller 1510 supplies the motor in the rotating stage(s) the appropriate power such that each wing 2, 6, 8 and 12 is rotated to the target position.

In some aspects, the rotating stage 1400 comprises an encoder and the encoder reports back to the motor controller 1510 and/or processor 1500 the actual position (feedback).

In other aspects, when the movement is manual, the operator may move the mobile upper support 505 to the target position corresponding to the selected line-item. In an aspect of the disclosure, the control arm(s) 500 may have markings indicating the positions such that the operator knows whether the upper cap 4 is at the target position. In other aspects, the control arm(s) 500 comprises a position sensor and the position sensor reports back to the processor 1500 the actual position (feedback) and the processor 1500 displays the actual position on the display. In other aspects, the processor 1500 may issue a notification when the position of the cap 4 is at the target position.

Similarly, when the movement is manual, the operator may move each wing to the target position corresponding to the selected line-item, e.g., rotate the wing. In an aspect of the disclosure, the hinge 3 may comprise a sensor or encoder that senses the angle and reports back to the processor 1500 the actual position (feedback) and the processor 1500 displays the actual position on a display such that the operator knows when the wings 2, 6, 8 and 12 are at the target position. In other aspects, the processor 1500 may issue a notification when the position of the upper cap 4 is at the target position.

In an aspect of the disclosure, the order of S1320 and S1325 may be reversed.

When the application is a whole-body scan, the patient bust depth and forearm-forearm breath may be measured at S1330. In an aspect of the disclosure, if the patient's medical record already contains the measurements, the processor 1500 may retrieve the measurement from electronic patient records. In other aspects, if the patient's medical record already contains the measurements in paper form, the operator may enter the measurements via a user interface (not shown). In an aspect of the disclosure, the operator may measure the patient's bust depth and forearm-forearm breath using any known measurement device. The measurement may be input into the processor 1500.

In other aspects, a still image may be taken of the patient and the bust depth and forearm-forearm breath may be determined by the processor 1500 via image processing and estimation. At S1310, the processor may retrieve the look-up table 1660. S1315-S1325 are then executed for the whole-body scan in a similar manner as described above.

Additionally, when needed, the processor 1500 may control the positions of the sides 114, 116 as described above.

As described above, portions of the scanner 100 may be selectively moved to target positions as needed to mostly conform to the patient's shape. The movement of the portions of the scanner 100 can be effected to achieve a structure that more nearly conforms to the section of the patient that is to be scanned, thus aiding in an increase in resolution and/or increase in imaging efficiency. Upon such movement, the scanner 100 can then acquire a PET scan of a patient.

While in the figures the upper portion moved and the lower portion is fixed, in some aspects of the disclosure, the lower portion may move and the upper portion may be fixed. In other aspects of the disclosure, both the upper portion and the lower portion may move.

Also, as described above, each wing is moved symmetrically, however, in other aspects, the wings 2, 6, 8, 12 may have different angles. For example, the upper wings 2, 6 may be at a first angle with respect to the upper cap 4 and the lower wings 8, 12 may be at a second angle with respect to the lower cap 10.

While the figures only show one wing on each side of the upper cap 4 (e.g., upper, left wing 2 and upper, right wing 6) and one wing on each side of the lower cap 10 (e.g., lower, left wing 8 and lower, right wing 12), in other aspects of the disclosure there may be multiple wing sections on each side. The length of each wing section may be made smaller then shown in the figures and each wing section may be angled with respect to the caps and other wing sections. For example, two wing sections may be rotatably attached to each other such that the shape of the scanner 100 may further conform to the shape of the patient 525.

In an aspect of the disclosure, the scanner 100 can be placed within a suitable housing and expose one or more selected regions of the patient to a PET scan. The PET scan can be acquired in several regions, and depending on the number of patient support positions required to cover the region to be scanned, the complete PET scan may take about 1, about 2, about 5, about 10, about 15, about 20, about 25, about 30, about 35, about 40, about 45, about 50, about 60 or more minutes.

In an aspect of the disclosure, the processor 1500 may be included within the housing of the scanner itself, or in a sufficiently connected (wireless or wired) manner with the scanner 100 and detection modules 520.

The processor 1500 is configured to process a plurality of supervised machine learning algorithms configured to perform three dimensional (3D) gamma ray localization of at least one interaction site within at least one scintillator crystal of the plurality of scintillator crystals.

Figure 17:
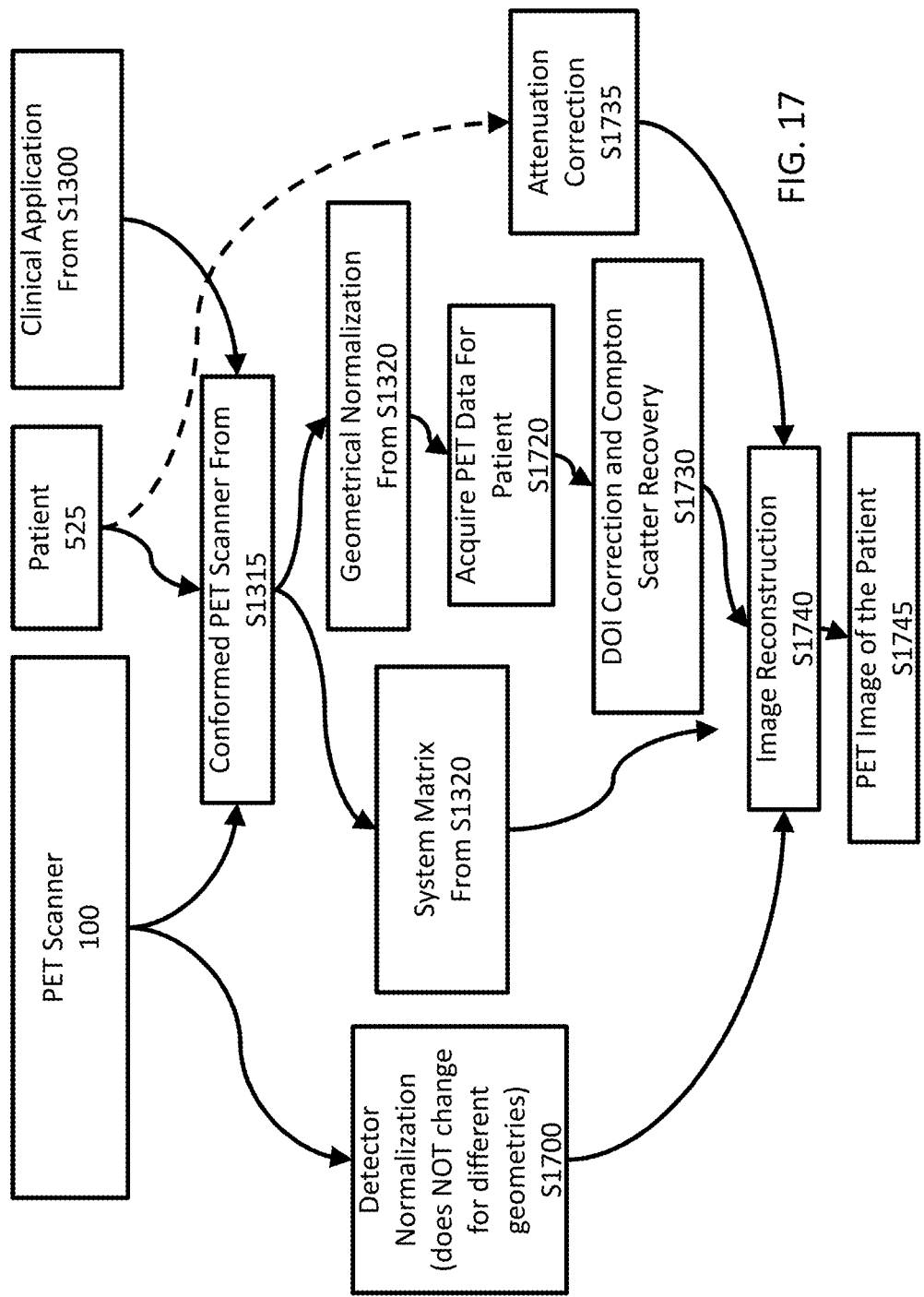
FIG. 17 is a diagram in accordance with aspects of the disclosure.

FIG. 17 illustrates a process of generating a PET image of a patient. The process depends on the clinical application which is determined from S1300. As described above, actual measurements of one or more features of the patient 525 and clinical application may be used to provide a conformed PET scanner 100 (described in S1315) which enhances sensitivity and improves spatial resolution (by reducing error due to accollinearity by reducing the lengths of line-of-responses). The system matrix corresponding to the scanner geometry that is used for generating the PET image is obtain from S1320 and the geometric dependent module(s) are obtained from S1320 (such as geometrical normalization).

System Matrix describes the relationship between image space and projection space. It contains some factors such as geometrical component and blurring component. As described above, the system matrix may be calculated for all available geometries beforehand. Once the geometry of the PET scanner 100 is finalized (based on patient measurement(s) and clinical application), the corresponding system matrix may be selected using a look-up table.

Normalization in positron emission tomography (PET) comprises two aspects: correction for differential detection module response (S1700) and correction for geometric effects (S1320). For geometric normalization, the geometrical artifact that arise for the irregular and conformal geometry of the PET scanner 100 are corrected. For example, geometrical normalization may be done using Monte-Carlo simulations. As described above, the geometrical normalization may be stored in memory in the look-up table.

For detection module normalization (S1700), the differential response of all detection modules are corrected to achieve uniform performance across the entire scanner. Detection module normalization may be done experimentally using a normalization scan (with point or rod radiation sources). At S1720 the Patient is scanned and emission coincidence data is acquired.

The mispositioning of line-of responses (LORs) is caused by DOI and Compton scattering. To correct for the mispositioned LORs, DOI correction and Compton scattering recovery is performed (S1730). At S1730, the processor 1500 executes DOI Correction which corrects for parallax effect (i.e., geometrical blur due to mispositioning of line-of-responses (LORs)) using depth-of-interaction (DOI) information of interacting gamma-rays in the scintillator crystals. In addition, at S1730, the processor 1500 can also be configured to corrected for the mispositioned LORS due to Compton scatter by performing Compton scatter recovering using depth of interaction (DOI) information by recovering at least one Compton event scattering among the plurality of scintillator crystals, and localize the at least one Compton event at a scintillator level based on 3D gamma ray localization for each of the at least one detection module 520. The processor 1500 can be further configured to localize at least one Compton event based on decomposed energies of at least two interactions absorbed in the plurality of scintillator crystals, with the decomposed energies based on at least one light sharing pattern and the at least one light sharing pattern being based on positions of the plurality of scintillator crystals relative to the plurality of detectors and light guides of each of the detectors 520.

At S1735, the processor 1500 executes attenuation correction. Attenuation is the loss of detection of true coincidence events (i.e., back-to-back gamma rays) because of their absorption in the body. Loss of counts due to attenuation increases image noise, image artifacts, and image distortion. Attenuation correction compensates for such lost counts and eliminates significant artifacts which may occur on PET scans.

In S1740, the processor 1500 performs image reconstruction using a maximum-likelihood expectation maximization (MLEM) algorithm based on the geometric dependent system matrix, the normalization factors (detection modules and geometrical), DOI correction, Compton scatter correction, and attenuation correction and the acquired patient.

Based on various processes of processor 1500, the processor 1500 can also be configured to reconstruct a tomographic image, both two dimensional as well as three dimensional, of the region of interest of the patient using any suitable reconstruction algorithm(s).

That reconstructed image can be shown on a display (not shown) that is a part of, or is connected to (wired/wirelessly) to the scanner 100 at S1745. As one example of use of the display, the processor 1500 can reconstruct the region of the patient or object being scanned from the TOF data. The reconstruction can then be used for three-dimensional rendering, multi-planar reconstruction, or two-dimensional imaging of the function of the tissue of the patient. The images can then be displayed on the display. The display can be a CRT, LCD, plasma screen, projector, printer, or other output device for showing an image, and can be sufficiently connected (wireless or wired) manner with the processor 1500.

The scanner also can have an input for entering control information, e.g. imaging parameters and examination parameters, and an output for outputting control information and reconstructed images.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, a single FPGA may be used or multiple FPGAs may be used to achieve the functions, features or instructions described herein. For example, multiple processors may allow load balancing. In a further example, a server (also known as remote, or cloud) processor may accomplish some or all functionality on behalf of a client processor.

As used herein, the term "processor" or the term "controller" may be replaced with the term "circuit". The term "processor" may refer to, be part of, or include processor hardware (shared, dedicated, or group) that executes code and memory hardware (shared, dedicated, or group) that stores code executed by the processor.

The processor 1500 may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple processors that are connected via the interface circuits.

Further, in some aspect of the disclosure, a non-transitory computer-readable storage medium comprising electronically readable control information stored thereon, configured in such that when the storage medium is used in a processor, aspects of the functionality described herein is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The present disclosure is further illustrated by the following non-limiting examples:

Example 1

Three key metrics drive the performance and viability assessment of a PET scanner (and this the PET system: sensitivity, spatial resolution, and cost. There are fundamental limits—determined by the laws of physics, mathematics, and economics—on the attainable sensitivity, spatial resolution, and cost of a PET scanner. Thus, an evaluation can be made a scanner as described herein in some aspects of the disclosure by comparing its fundamental limits with those of the current state of the art—represented by the cylindrical Siemens® Biograph Vision® Scanner.

Sensitivity

The sensitivity of a PET scanner—a key driver of patient dose and image quality—is controlled by the geometry of the scanner and the efficiency of the detectors:

Sensitivity≤Geometric Efficiency*Detector Efficiency

Analytical methods were developed to quantify geometric efficiency of the certain aspects of the disclosure, and the current cylindrical PET scanners, such as the Siemens® Biograph Vision® Scanner.

Definition of Geometric Efficiency

Geometric efficiency is a key performance metric of any radiation detecting device, describing the fraction of emitted radiation that impinges on the detector. Since this measure depends on the position and nature of the radioactive source relative to the detector, it is assumed that radiation is emitted isotropically from a point source located at the center of the detector assembly. Mathematically, geometric efficiency E is defined in terms of the solid angle $\Omega$ subtended by the detector relative to radiation source.

$$E = \frac{\Omega}{4\pi} \tag{1}$$

Solid angle is defined as a surface integral over the entire surface s of the detector, with the origin defined by our point source of radiation.

$$\Omega \equiv \int\int_s \frac{\vec{r} \cdot da}{r^2} \tag{2}$$

Geometric Efficiency of the Claimed Device's Design

Leveraging the symmetry of the geometry of scanner 100 of FIG. 1a, the geometric efficiency E of the complete 6-plate array (the upper, left wing 2, the upper cap 4, the upper, right wing 6, the lower, left wing 8, the lower cap 10, and the lower, right wing 12) in terms of the solid angle coverage of the cap (either the upper cap 4 or the lower cap 10) and wing plates (either the upper, left wing 2 and the upper right wing 6, or, the lower, left wing 8 and the lower, right wing 12) can be written as follows:

$$E(a_{cap}, a_{wing}, b, h_{cap}, \theta) = \frac{1}{4\pi}(2\Omega_{cap} + 4\Omega_{wing}) \tag{3}$$

In order to find the solid angle coverage of the cap and wing plates, a general expression for the solid angle subtended by a plate was developed, and then that expression was applied to find $\Omega_{cap}$ and $\Omega_{wing}$.

Solid Angle of a Plate

Figure 2:
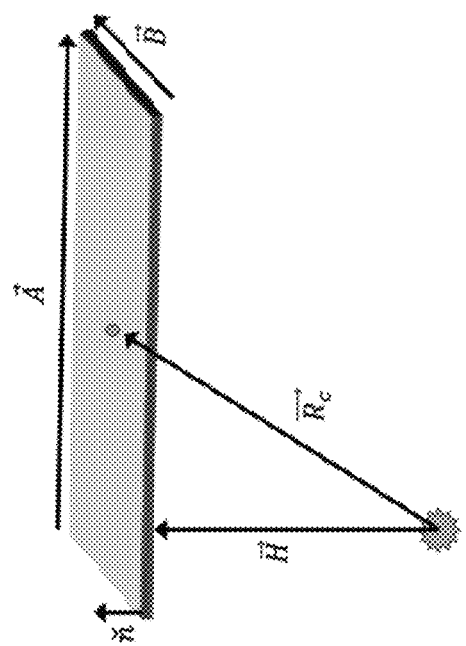
FIG. 2 is diagram of the Geometrical parameters used to calculate solid angle coverage of a generalized plate relative to a point source (orange star)

The geometry of a generalized plate relative to a point source is illustrated in FIG. 2. The geometry is specified by just 4 parameters: the unit vector normal to the plane of the plate $\check{n}$, the radial vector connecting the point source to the center of the plate $\vec{R}_c$, and vectors A, B specifying the edges of the plate. The vector H is a convenient quantity, representing the shortest distance from the point source to the plane of the plate (note that H need not fall on the plate itself). It is defined:

$$\vec{N} = |\vec{R}_c \cdot \check{n}| * \check{n} \tag{4}$$

An expression for the case where the plate is centered above the point source, or $\vec{H} = \vec{R}_c$ was developed. Working in a cartesian coordinate system with z oriented along $\vec{R}_c$ and $\check{x}$ along $\vec{A}$, and applying the appropriate substitutions into equation 2, the following equation is the result:

$$\Omega_o = \int_{-\frac{b}{2}}^{\frac{b}{2}} \int_{-\frac{a}{2}}^{\frac{a}{2}} \frac{h}{(x^2 + y^2 + h^2)^{\frac{3}{2}}} dxdy \tag{5}$$

where $a=|\vec{A}|$, $b=|\vec{B}|$ and $h=|\vec{H}|$. This integral can then be evaluated to:

$$\Omega_o(a, b, h) = 4\tan^{-1}\frac{\alpha\beta}{\sqrt{1+\alpha^2+\beta^2}} \tag{6}$$

for $\alpha \equiv a/(2h)$ and $\beta = b/(2h)$.

Next, an expression for solid angle coverage in the more general scenario where the plate center is offset by $\vec{W} = \vec{R}_c - \vec{H}$ along $\vec{A}$ was developed. By leveraging symmetries, this solid angle $\Omega_1$ can be expressed as a linear combination of the solid angles subtended by centered plates, $\Omega_1 = \Sigma_i c_i \Omega_0(a_i, b_i, h_i)$. An expression is given separately for each of the two possible geometric scenarios: (1) $\vec{H}$ intersects the plate and (2) $\vec{H}$ does not intersect the plate.

In scenario 1, defined by $w<a/2$ for $w=|\vec{W}|$, it can be shown from geometrical reasoning that:

$$\Omega_1^{(1)}(a, b, h, w) = \frac{1}{2}(\Omega_o(a+2w, b, h) - \Omega_o(2w-a, b, h)) \tag{7.1}$$

Similarly, for Scenario 2, defined by $w>a/2$, it may be shown that:

$$\Omega_1^{(2)}(a, b, h, w) = \frac{1}{2}(\Omega_o(a+2w, b, h) - \Omega_o(a-2w, b, h)) \tag{7.2}$$

Together, these expressions give a complete algorithm for calculating $\Omega_1(a, b, h, w)$.

Solid Angle Coverage of Components

With this general expression for the solid angle of a plate, $\Omega_{cap}$ and $\Omega_{wing}$ can be calculated within the context of the disclosed design in accordance with aspects of the disclosure. The following variables are to be found a, b, h, w in terms of the geometrical parameters of the disclosed design in FIG. 1.

Starting with $\Omega_{wing}$, the vectors defining the geometry, utilizing a Cartesian coordinate system with $\check{x}$, $\underline{y}$ defining the transaxial plane are below:

$$\check{n} = \sin\theta\check{x} + \cos\theta\check{y} \tag{8}$$

$$\vec{R}_c = \left(\frac{a_{cap}}{2} + \frac{a_{wing}}{2}\cos\theta\right)\check{x} + \left(h - \frac{a_{wing}}{2}\sin\theta\right)\check{y} \tag{9}$$

With H defined by Eq. 4, the solid angle of the wing is then given as $$\Omega_{wing} = \Omega_1(a_{wing}, b, |\vec{H}|, |\vec{R}_c - \vec{H}|) \tag{10}$$

Also, the solid angle of a cap plate is given as:

$$\Omega_{cap} = \Omega_1(a_{cap}, b, h_{cap}, 0) \tag{11}$$

Thus, equations 4-11 enable analytical computation of the geometrical efficiency of the disclosed design for all reasonable combinations of $a_{cap}$, $a_{wing}$, b, $h_{cap}$, θ.

Geometric Efficiency of a Cylindrical PET

In order to quantitatively illustrate the advantages of the disclosed design in accordance with aspects of the disclosure over the standard cylindrical PET geometry, an analytical expression for the geometric efficiency of a cylindrical PET of diameter D and axial length L is constructed. Working in cylindrical coordinates and making appropriate substitutions, the surface integral for solid angle is written as:

$$\Omega_{cyl} = \int_{-\frac{L}{2}}^{\frac{L}{2}} \int_0^{2\pi} \frac{(D/2)^2}{\left((D/2)^2 + z^2\right)^{\frac{3}{2}}} d\varphi dz \tag{12}$$

which can be evaluated to:

$$\Omega_{cyl} = \frac{4\pi}{\sqrt{\delta^2 + 1}} \tag{13}$$

For δ=D/L. The geometric efficiency of the cylinder can be written as:

$$E_{cyl} = \frac{1}{\sqrt{\delta^2 + 1}} \tag{14}$$

Sensitivity

Spatial resolution is a fundamental metric of image quality for any scanner system. However, it is of particular concern in PET, where spatial resolution of typical systems (3-4 mm) trails other modalities (e.g. CT, MRI) and poses significant limitations on the clinical utility of PET. A fundamental upper limit on spatial resolution Γ may be given in terms of scintillator crystal width d, positron range s, and detector ring radius R, where the radius term describes the contribution of acollinearity.

$$\Gamma = \sqrt{\left(\frac{d}{2}\right)^2 + s^2 + (0.0044R)^2} \text{ (mm fwhm)} \tag{15}$$

As positron range is a function of the radioisotope used, and crystal dimensions may be optimized within the constraints of a scanner geometry.

Estimating the Equivalent Radius of the Disclosed Design

Figure 3:
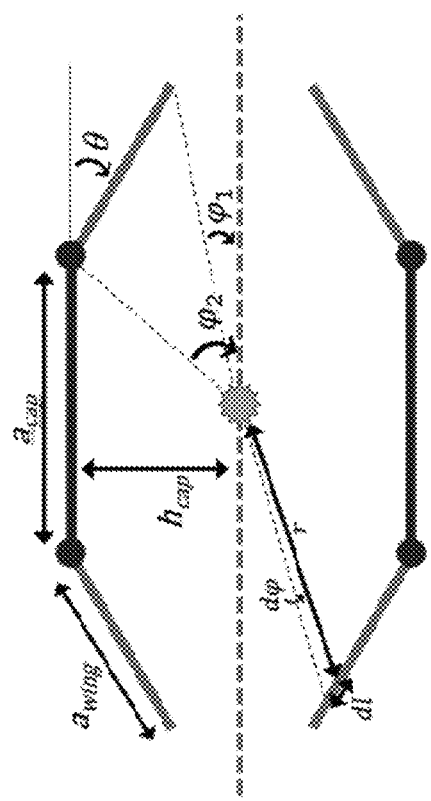
FIG. 3 is a transaxial view indicating the terminology used to calculate the equivalent radius of a scanner in accordance with aspects of the disclosure, $R_{Arc}$. The angular extent of the wing plate is given by $\varphi_2-\varphi_1$, and the cap plate by $\pi-2\varphi$.

Since the geometric contribution to the upper bound on spatial resolution is given in terms of the radius of the detector ring (assuming the typical, cylindrical geometry), an equivalent estimate for the disclosed device, $R_{Arc}$. This R within the acollinearity term can be viewed as the average travel distance to a detector element among photons emerging isotropically from the center of the detector assembly (ignoring the axial length of the scanner). In this light, $R_{Arc}$ can be found by computing the average radial distance r to each element of detector plate dl, weighted by the angle subtended by the element dφ (FIG. 3). As with the solid angle calculation, $R_{Arc}$ will be derived piecewise, first finding the equivalent radius of a wing plate $R_{wing}$ and a cap plate $R_{cap}$, and then constructing $R_{Arc}$ through appropriate linear combinations of $R_{wing}$ and $R_{cap}$.

First, the integral for average radial distance to each plate is:

$$R_{cap} = \frac{2}{\frac{\pi}{2} - \varphi_2} \int_{\frac{\pi}{2}}^{\varphi_2} r_{cap}(\varphi) d\varphi, \quad R_{wing} = \frac{1}{\varphi_2 - \varphi_1} \int_{\varphi_2}^{\varphi_1} r_{wing}(\varphi) d\varphi \tag{16}$$

where $r_{eap}(\varphi)$ and $r_{wing}(\varphi)$ are equations of the lines defined by the cap and wing plates, respectively, in polar coordinates:

$$r_{cap}(\varphi) = \frac{h_{cap}}{\sin\varphi}, \quad r_{wing}(\varphi) = \frac{h_{cap} + \tan\theta * (a_{cap}/2)}{\sin\varphi + \tan\theta\cos\varphi} \tag{17}$$

and $\varphi_1$, $\varphi_2$ define the angular locations of the end points of the wing plate:

$$\varphi_1 = \tan^{-1}\frac{h_{cap}a_{wing}\sin\theta}{\frac{a_{cap}}{2} + a_{wing}\cos\theta}, \quad \varphi_2 = \tan^{-1}\frac{2h_{cap}}{a_{cap}} \tag{18}$$

Next, $R_{Arc}$ is found by combining $R_{wing}$ and $R_{cap}$ by the appropriate weights, corresponding to the total angle subtended by each class of plates:

$$R_{Arc} = 2\left(\frac{\pi - 2\varphi_2}{\Phi}\right)R_{cap} + 4\left(\frac{\varphi_2 - \varphi_1}{\Phi}\right)R_{wing} \tag{19}$$

where $\Phi = 2\pi - 4\varphi_1$ represents the total angle subtended by the 6 plates of the disclosed device.

Cost

Scintillator crystals are the largest driver of cost for a PET system—the unit cost of these crystals remains high, and a very large number of them (~105) are required to populate an entire, typical detector assembly. Therefore, the detector surface area σ is a reasonable benchmark to estimate the lower limit of cost. Simple geometry provides the surface area for both the disclosed device and the cylindrical design:

$$\sigma_{Arc} = b*(4a_{wing} + 2a_{cap}), \sigma_{Cyl} = \pi*D*L \tag{20}$$

Where $a_{wing}$, $a_{cap}$ represent the transaxial lengths of the wing and cap plates of the disclosed device, and b gives the axial length. For the typical, cylindrical case, D gives the diameter of the detector ring while L represents the axial length.

Use Case

Figure 4:
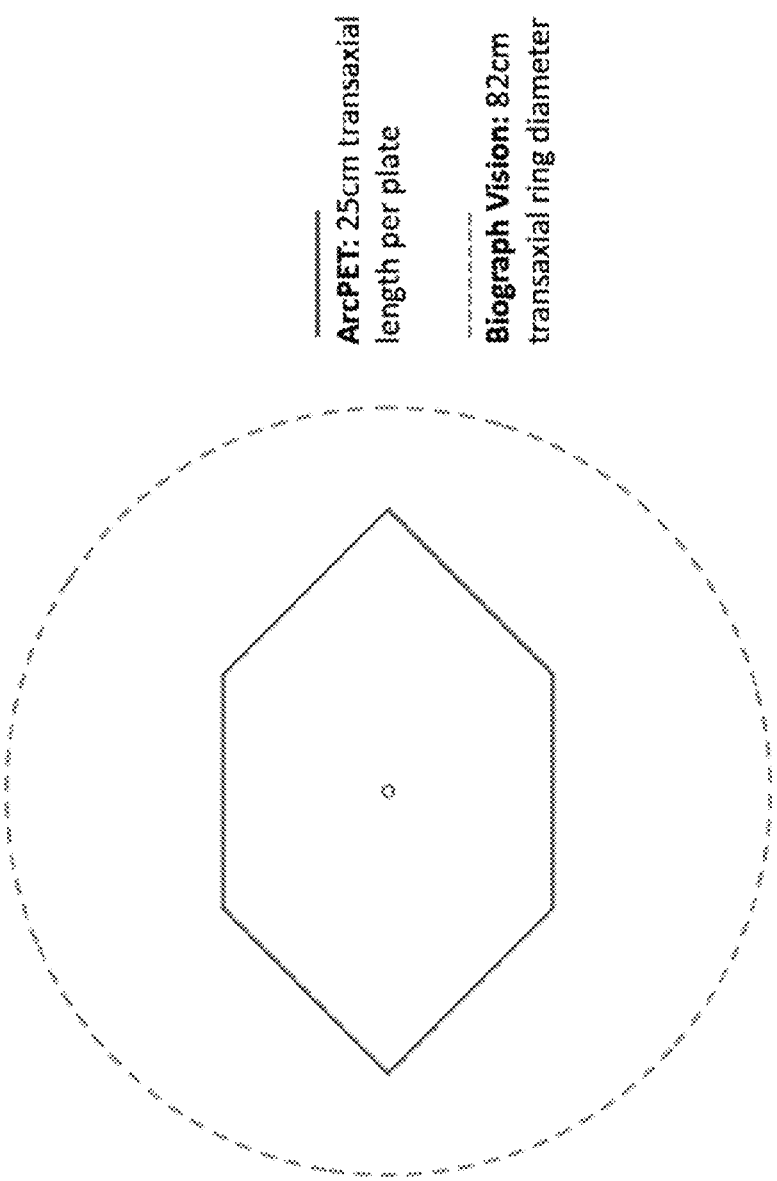
FIG. 4 is a transaxial scale representation of a geometry of a PET scanner in accordance with aspects of the disclosure, inset within the current geometry of the state-of-the-art Siemens® Biograph Vision® Scanner.

With the above analytical tools for quantifying sensitivity, spatial resolution, and cost, a realistic example comparing the disclosed device as shown in e.g., FIG. 1a with a current state-of-the-art PET system—Siemens® Biograph Vision® Scanner is provided. For the purpose of comparison, a closed hexagonal geometry of the disclosed device is used, with $a_{cap} = a_{wing} = 25$ cm, b=26 cm, $h_{cap} = 17.7$ cm, and θ=π/4. These dimensions in comparison to a Siemens® Biograph Vision® Scanner (ring diameter of 82 cm and axial length of 26 cm) are shown in FIG. 4.

With these dimensions, the disclosed design as shown in e.g., FIG. 1a realizes about a 73% increase in geometric efficiency over Biograph Vision®: 51.8% vs 30.2%. Utilizing common parameters for positron range (0.54 mm fwhm)

and crystal width (3 mm), the lower limit on spatial resolution improves by at least about 0.5 mm for the disclosed device vs Biograph Vision®.

This improvement supported by a difference in geometry, with an equivalent radius of about 21.7 cm for the disclosed device vs. a true ring radius of 41 cm for Biograph Vision®. Finally, the reduced dimensions of the disclosed device as shown in e.g., FIG. 1a enables about a 42% reduction in scintillator crystal material, the most significant driver of cost for a PET system. These values are also shown in the Table depicted in FIG. 18.

Disclosed Device

The described aspects and examples of the present disclosure are intended to be illustrative rather than restrictive, and are not intended to represent every aspect or example of the present disclosure. While the fundamental novel features of the disclosure as applied to various specific aspects thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or aspects of the disclosure may be incorporated in any other disclosed or described or suggested form or aspects as a general matter of design choice. Further, various modifications and variations can be made without departing from the spirit or scope of the disclosure as set forth in the following claims both literally and in equivalents recognized in law.

What is claimed is:

1. A device comprising:
    an upper portion comprising:
        an upper first wing;
        an upper cap operably connected to the upper first wing; and
        an upper second wing operably connected to the upper cap;
    a lower portion comprising:
        a lower first wing;
        a lower cap operably connected to the lower first wing; and
        a lower second wing operably connected to the lower cap, wherein
    the upper portion and lower portion define a cavity, wherein at least one of the upper portion or lower portion is moveable to change a distance between the upper portion and the lower portion, and wherein at least one of the upper first wing, the upper cap, the upper second wing, the lower first wing, the lower cap, and the lower second wing comprises one or more detection modules,
    wherein the one or more detection modules comprise:
        a scintillator array comprising a plurality of scintillator crystals;
        a plurality of detectors provided on a first end of the scintillator array; and
        a plurality of prismatoids provided on a second end of the scintillator array, wherein each prismatoid of the plurality of prismatoids is configured to redirect particles between second ends of scintillator crystals of the scintillator array,
    wherein first ends of a first group of scintillator crystals of the scintillator array are configured to direct particles to a first detector of the plurality of detectors, and
    wherein first ends of a second group of scintillator crystals of the scintillator array are configured to direct particles to a second detector substantially adjacent to the first detector, wherein the plurality of prismatoids is oriented towards the cavity.

2. The device of claim 1, wherein the upper portion is moveable relative to the lower portion changing the distance between the upper portion and the lower portion.

3. The device of claim 1, wherein the upper first wing is operably connected to the upper cap via a hinge and forms a first angle with the upper cap and the upper first wing is rotatable, and wherein the upper second wing is operably connected to the upper cap via a hinge and forms a second angle with the upper cap and the upper second wing is rotatable.

4. The device of claim 1, further comprising a first side portion and a second side portion, wherein the first side portion and the second side portion comprises one or more detection modules.

5. A method of performing a positron emission tomography (PET) scan comprising:
    determining a position of the upper cap and/or angles of at least one wing of the device of claim 1 based on actual measurements of at least one feature of a patient to be inserted into the cavity such that the device of claim 1 has a conformal geometry with the patient, each angle formed by a respective wing of claim 1 with a respective cap of claim 1;
    moving at least one portion of the device of claim 1 based on the determination, where the at least one portion of the device is selected from the group consisting of moving the upper, first wing with respect to the upper cap, moving the upper second wing with respect to the upper cap, moving the lower first wing with respect to the lower cap, moving the lower second wing with respect to the lower cap, and moving the upper cap with respect to the lower cap;
    selecting a system matrix used for image reconstruction based on the determined position; and
    acquiring a PET scan; and
    generated an image based on information from the PET scan and the system matrix.

6. The device of claim 2, wherein a position of the upper cap with respect to the lower cap is determined based on a measurement of at least one feature of a patient to be inserted into the cavity and a determined clinician application.

7. A positron emission tomography (PET) system for acquiring a PET image comprising:
    the device of claim 2; and
    a processor configured to control a position of the upper cap to change the distance between the upper portion and the lower portion.

8. The device of claim 6, wherein the clinician application is selected from a group consisting of a brain scan and a whole-body scan.

9. The device of claim 3, wherein the lower first wing is operably connected to the lower cap via a hinge and forms a third angle with the lower cap and the lower first wing is rotatable, and wherein the lower second wing is operably connected to the lower cap via a hinge and forms a fourth angle with the lower cap and the lower second wing is rotatable.

10. The device of claim 9, wherein each of the first angle, the second angle, the third angle and the fourth angle is determined based on a measurement of at least one feature of a patient to be inserted into the cavity and a determined clinician application.

11. A positron emission tomography (PET) system for acquiring a PET image comprising: the device of claim 9; and
a processor configured to control the first angle, the second angle, the third angle and the fourth angle and a position of the upper cap.

12. The device of claim 8, wherein the clinician application is a brain scan and the at least one feature is a measurement of a patient's head.

13. The device of claim 8, wherein the clinician application is a whole-body scan and the at least one feature is a bust depth and forearm-forearm breath.

14. The device of claim 4, wherein the first side portion and the second side portion are moveable toward and away from each other, and wherein the first side portion and the second side portion are configured to move between the upper portion and the lower portion such that the device substantially surrounds a patient when inserted.

15. A positron emission tomography (PET) system for acquiring a PET image comprising:
a device comprising:
an upper portion comprising:
an upper first wing;
an upper cap operably connected to the upper first wing; and
an upper second wing operably connected to the upper cap;
a lower portion comprising:
a lower first wing;
a lower cap operably connected to the lower first wing; and
a lower second wing operably connected to the lower cap, wherein
the upper portion and lower portion define a cavity, wherein at least one of the upper portion or lower portion is moveable to change a distance between the upper portion and the lower portion, and wherein at least one of the upper first wing, the upper cap, the upper second wing, the lower first wing, the lower cap, and the lower second wing comprises one or more detection modules,
wherein the upper portion is moveable relative to the lower portion changing the distance between the upper portion and the lower portion; and
a processor configured to control the position of the upper cap to change the distance between the upper portion and the lower portion,
wherein a position of the upper cap is selected from a plurality of preset positions.

16. The PET system of claim 15, wherein the processor is configured to select the position from the plurality of preset positions based on a measurement of a bust depth or head circumference.

17. The PET system of claim 15,
wherein in the device,
the upper first wing is operably connected to the upper cap via a hinge and forms a first angle with the upper cap and the upper first wing is rotatable, and wherein the upper second wing is operably connected to the upper cap via a hinge and forms a second angle with the upper cap and the upper second wing is rotatable, and the lower first wing is operably connected to the lower cap via a hinge and forms a third angle with the lower cap and the lower first wing is rotatable, and wherein the lower second wing is operably connected to the lower cap via a hinge and forms a fourth angle with the lower cap and the lower second wing is rotatable; and
the processor is further configured to control the first angle, the second angle, the third angle and the fourth angle, and
wherein each of the first angle, the second angle, the third angle and the fourth angle is selected from a plurality of preset angles.

18. The PET system of claim 17, wherein each of the first angle, the second angle, the third angle and the fourth angle is selected based on a forearm-forearm breath.

19. A positron emission tomography (PET) system for acquiring a PET image comprising:
a device comprising:
an upper portion comprising:
an upper first wing;
an upper cap operably connected to the upper first wing; and
an upper second wing operably connected to the upper cap;
a lower portion comprising:
a lower first wing;
a lower cap operably connected to the lower first wing; and
a lower second wing operably connected to the lower cap, wherein
the upper portion and lower portion define a cavity, wherein at least one of the upper portion or lower portion is moveable to change a distance between the upper portion and the lower portion, and wherein at least one of the upper first wing, the upper cap, the upper second wing, the lower first wing, the lower cap, and the lower second wing comprises one or more detection modules,
wherein the upper portion is moveable relative to the lower portion changing the distance between the upper portion and the lower portion;
a memory having a table comprising available positions for the upper cap and/or angles, each angle formed by a respective wing with a respective cap and associated measurements of features; and
a processor configured to control a position of the upper cap to change the distance between the upper portion and the lower portion.

20. The PET system of claim 19, wherein a position and/or the angles are selected using the table and actual measurement of features of a patient to be inserted into the cavity by comparing the actual measurement with the associated measurement of the features in the table.

21. The PET system of claim 19, wherein the table further comprises a system matrix associated with available positions for the upper cap and/or the angles.

22. The PET system of claim 21, wherein the processor is configured to select the system matrix associated with a selected position and/or the angles for use in image reconstruction.

23. The PET system of claim 22, wherein the processor is in operative communication with the one or more detection modules, wherein the processor is configured to process a plurality of supervised machine learning algorithms configured to perform three dimensional (3D) gamma ray localization.

24. The PET system of claim 23, wherein the processor is further configured to correct for mispositioned line-of responses (LORs) due to Compton scatter by performing Compton scatter recovery using depth of interaction (DOI) information.

* * * * *